(12) United States Patent
Cape et al.

(10) Patent No.: US 10,800,203 B2
(45) Date of Patent: Oct. 13, 2020

(54) POLYMERIC SHEET MATERIAL FOR USE IN MAKING POLYMERIC SECURITY DOCUMENTS SUCH AS BANKNOTES

(71) Applicants: VISUAL PHYSICS, LLC, Alpharetta, GA (US); CRANE SECURITY TECHNOLOGIES, INC., Nashua, NH (US)

(72) Inventors: Samuel M. Cape, Woodstock, GA (US); Paul F. Cote, Hollis, NH (US); Jonathan D. Gosnell, Cumming, GA (US)

(73) Assignees: VISUAL PHYSICS, LLC, Alpharetta, GA (US); CRANE SECURITY TECHNOLOGIES, INC., Nashua, NH (US)

( * ) Notice: Subject to any disclaimer, the term of this patent is extended or adjusted under 35 U.S.C. 154(b) by 0 days.

(21) Appl. No.: 15/326,129

(22) PCT Filed: Jul. 16, 2015

(86) PCT No.: PCT/US2015/040745
§ 371 (c)(1),
(2) Date: Jan. 13, 2017

(87) PCT Pub. No.: WO2016/011249
PCT Pub. Date: Jan. 21, 2016

(65) Prior Publication Data
US 2017/0210161 A1 Jul. 27, 2017

Related U.S. Application Data

(60) Provisional application No. 62/025,637, filed on Jul. 17, 2014.

(51) Int. Cl.
*B42D 25/373* (2014.01)
*B42D 25/324* (2014.01)
(Continued)

(52) U.S. Cl.
CPC ............ *B42D 25/373* (2014.10); *B41F 11/02* (2013.01); *B42D 25/29* (2014.10); *B42D 25/324* (2014.10);
(Continued)

(58) Field of Classification Search
CPC ...... B42D 25/373; B42D 25/43; B42D 25/29; B42D 25/351; B42D 25/455; B42D 25/47;
(Continued)

(56) References Cited

U.S. PATENT DOCUMENTS 992,151 A  5/1911  Berthon
1,824,353 A  9/1931  Jensen
(Continued)

FOREIGN PATENT DOCUMENTS

AU  2009278275  7/2012
CA  2741298  4/2010
(Continued)

OTHER PUBLICATIONS

Article: "Spherical Lenses" (Jan. 18, 2009); pp. 1-12; retrieved from the Internet: URL:http://www.physicsinsights.org/simple_optics_spherical_lenses-1.html.
(Continued)

*Primary Examiner* — Justin V Lewis

(57) ABSTRACT

An improved polymeric sheet material for use in making polymeric security documents such as banknotes is provided. The inventive polymeric sheet material has one or more integrated and/or applied optical security devices. Polymeric security documents made using these improved polymeric sheet materials are also provided.

16 Claims, 7 Drawing Sheets

(51) Int. Cl.
   *G03H 1/02*    (2006.01)
   *G03H 1/00*    (2006.01)
   *B41F 11/02*   (2006.01)
   *B42D 25/47*   (2014.01)
   *B42D 25/46*   (2014.01)
   *B42D 25/29*   (2014.01)
   *B42D 25/328*  (2014.01)
   *B42D 25/351*  (2014.01)
   *B42D 25/43*   (2014.01)
   *B42D 25/455*  (2014.01)

(52) U.S. Cl.
   CPC ......... *B42D 25/328* (2014.10); *B42D 25/351* (2014.10); *B42D 25/43* (2014.10); *B42D 25/455* (2014.10); *B42D 25/46* (2014.10); *B42D 25/47* (2014.10); *G03H 1/0011* (2013.01); *G03H 1/0252* (2013.01); *G03H 2001/0216* (2013.01); *G03H 2223/19* (2013.01); *G03H 2250/35* (2013.01)

(58) Field of Classification Search
   CPC ....... B42D 25/328; B42D 25/46; B41F 11/02; G03H 1/0252; G03H 1/0011; G03H 2250/35; G03H 2001/0216; G03H 2223/19
   USPC ......... 283/72, 73, 94, 98, 99, 106, 107, 108, 283/109, 111, 901
   See application file for complete search history.

(56)        References Cited

U.S. PATENT DOCUMENTS

| | | |
|---|---|---|
| 1,849,036 A | 3/1932 | Ernst |
| 1,942,841 A | 1/1934 | Shimizu |
| 2,268,351 A | 12/1941 | Tanaka |
| 2,355,902 A | 8/1944 | Berg |
| 2,432,896 A | 12/1947 | Hotchner |
| 2,888,855 A | 6/1959 | Tanaka |
| 2,992,103 A | 7/1961 | Land et al. |
| 3,122,853 A | 3/1964 | Koonz et al. |
| 3,241,429 A | 3/1966 | Rice et al. |
| 3,264,164 A | 8/1966 | Jerothe et al. |
| 3,312,006 A | 4/1967 | Rowland |
| 3,357,772 A | 12/1967 | Rowland |
| 3,357,773 A | 12/1967 | Rowland |
| 3,463,581 A | 8/1969 | Clay |
| 3,609,035 A | 9/1971 | Ataka |
| 3,643,361 A | 2/1972 | Eaves |
| 3,704,068 A | 11/1972 | Waly |
| 3,801,183 A | 4/1974 | Sevelin et al. |
| 3,811,213 A | 5/1974 | Eaves |
| 3,887,742 A | 6/1975 | Reinnagel |
| 4,025,673 A | 5/1977 | Reinnagel |
| 4,073,650 A | 2/1978 | Yevick |
| 4,082,426 A | 4/1978 | Brown |
| 4,185,191 A | 1/1980 | Stauffer |
| 4,345,833 A | 8/1982 | Siegmund |
| 4,417,784 A | 11/1983 | Knop et al. |
| 4,498,736 A | 2/1985 | Griffin |
| 4,507,349 A | 3/1985 | Fromson et al. |
| 4,519,632 A | 5/1985 | Parkinson et al. |
| 4,534,398 A | 8/1985 | Crane |
| 4,634,220 A | 1/1987 | Hockert et al. |
| 4,645,301 A | 2/1987 | Orensteen et al. |
| 4,662,651 A | 5/1987 | Mowry, Jr. |
| 4,688,894 A | 8/1987 | Hockert |
| 4,691,993 A | 9/1987 | Porter et al. |
| 4,756,972 A | 7/1988 | Kloosterboer et al. |
| 4,765,656 A | 8/1988 | Becker et al. |
| 4,814,594 A | 3/1989 | Drexler |
| 4,892,336 A | 1/1990 | Kaule et al. |
| 4,892,385 A | 1/1990 | Webster, Jr. et al. |
| 4,920,039 A | 4/1990 | Fotland et al. |
| 4,935,335 A | 6/1990 | Fotland |
| 4,988,126 A | 1/1991 | Heckenkamp et al. |
| 5,044,707 A | 9/1991 | Mallik |
| 5,074,649 A | 12/1991 | Hamanaka |
| 5,085,514 A | 2/1992 | Mallik et al. |
| 5,135,262 A | 8/1992 | Smith et al. |
| 5,142,383 A | 8/1992 | Mallik |
| 5,211,424 A | 5/1993 | Bliss |
| 5,215,864 A | 6/1993 | Laakmann |
| 5,232,764 A | 8/1993 | Oshima |
| 5,254,390 A | 10/1993 | Lu |
| 5,282,650 A | 2/1994 | Smith et al. |
| 5,359,454 A | 10/1994 | Steenblik et al. |
| 5,384,861 A | 1/1995 | Mattson et al. |
| 5,393,099 A | 2/1995 | D'Amato |
| 5,393,590 A | 2/1995 | Caspari |
| 5,413,839 A | 5/1995 | Chatwin et al. |
| 5,433,807 A | 7/1995 | Heckenkamp et al. |
| 5,438,928 A | 8/1995 | Chatwin et al. |
| 5,442,482 A | 8/1995 | Johnson et al. |
| 5,449,200 A | 9/1995 | Andric et al. |
| 5,460,679 A | 10/1995 | Abdel-Kader |
| 5,461,495 A | 10/1995 | Steenblik et al. |
| 5,464,690 A | 11/1995 | Boswell |
| 5,468,540 A | 11/1995 | Lu |
| 5,479,507 A | 12/1995 | Anderson |
| 5,492,370 A | 2/1996 | Chatwin et al. |
| 5,503,902 A | 4/1996 | Steenblik et al. |
| 5,538,753 A | 7/1996 | Antes et al. |
| 5,543,942 A | 8/1996 | Mizuguchi et al. |
| 5,555,476 A | 9/1996 | Suzuki et al. |
| 5,567,276 A | 10/1996 | Boehm et al. |
| 5,568,313 A | 10/1996 | Steenblik et al. |
| 5,574,083 A | 11/1996 | Brown et al. |
| 5,575,507 A | 11/1996 | Yamauchi et al. |
| 5,598,281 A | 1/1997 | Zimmerman et al. |
| 5,623,347 A | 4/1997 | Pizzanelli |
| 5,623,368 A | 4/1997 | Calderini et al. |
| 5,626,969 A | 5/1997 | Joson |
| 5,631,039 A | 5/1997 | Knight et al. |
| 5,639,126 A | 6/1997 | Dames et al. |
| 5,642,226 A | 6/1997 | Rosenthal |
| 5,643,678 A | 7/1997 | Boswell |
| 5,670,003 A | 9/1997 | Boswell |
| 5,670,096 A | 9/1997 | Lu |
| 5,674,580 A | 10/1997 | Boswell |
| 5,688,587 A | 11/1997 | Burchard et al. |
| 5,695,346 A | 12/1997 | Sekiguchi et al. |
| 5,712,731 A | 1/1998 | Drinkwater et al. |
| 5,723,200 A | 3/1998 | Oshima et al. |
| 5,731,064 A | 3/1998 | Suss |
| 5,737,126 A | 4/1998 | Lawandy |
| 5,753,349 A | 5/1998 | Boswell |
| 5,759,683 A | 6/1998 | Boswell |
| 5,763,349 A | 6/1998 | Zandona |
| 5,783,017 A | 7/1998 | Boswell |
| 5,783,275 A | 7/1998 | Mück et al. |
| 5,800,907 A | 9/1998 | Yumoto |
| 5,810,957 A | 9/1998 | Boswell |
| 5,812,313 A | 9/1998 | Johansen et al. |
| 5,886,798 A | 3/1999 | Staub et al. |
| 5,933,276 A | 8/1999 | Magee |
| 5,949,420 A | 9/1999 | Terlutter |
| 5,995,638 A | 11/1999 | Amidror et al. |
| 6,030,691 A | 2/2000 | Burchard et al. |
| 6,036,230 A | 3/2000 | Färber |
| 6,036,233 A | 3/2000 | Braun et al. |
| 6,060,143 A | 5/2000 | Tompkin et al. |
| 6,084,713 A | 7/2000 | Rosenthal |
| 6,089,614 A | 7/2000 | Howland et al. |
| 6,106,950 A | 8/2000 | Searle et al. |
| 6,144,795 A | 11/2000 | Dawes et al. |
| 6,176,582 B1 | 1/2001 | Grasnick |
| 6,177,953 B1 | 1/2001 | Vachette et al. |
| 6,179,338 B1 | 1/2001 | Bergmann et al. |
| 6,195,150 B1 | 2/2001 | Silverbrook |
| 6,249,588 B1 | 6/2001 | Amidror et al. |
| 6,256,149 B1 | 7/2001 | Rolfe |
| 6,256,150 B1 | 7/2001 | Rosenthal |

(56) References Cited

U.S. PATENT DOCUMENTS

| | | |
|---|---|---|
| 6,283,509 B1 | 9/2001 | Braun et al. |
| 6,288,842 B1 | 9/2001 | Florczak et al. |
| 6,297,911 B1 | 10/2001 | Nishikawa et al. |
| 6,301,363 B1 | 10/2001 | Mowry, Jr. |
| 6,302,989 B1 | 10/2001 | Kaule |
| 6,328,342 B1 | 12/2001 | Belousov et al. |
| 6,329,040 B1 | 12/2001 | Oshima et al. |
| 6,329,987 B1 | 12/2001 | Gottfried et al. |
| 6,345,104 B1 | 2/2002 | Rhoads |
| 6,348,999 B1 | 2/2002 | Summersgill et al. |
| 6,350,036 B1 | 2/2002 | Hannington et al. |
| 6,369,947 B1 | 4/2002 | Staub et al. |
| 6,373,965 B1 | 4/2002 | Liang |
| 6,381,071 B1 | 4/2002 | Dona et al. |
| 6,396,636 B2 | 5/2002 | Sawaki et al. |
| 6,404,555 B1 | 6/2002 | Nishikawa |
| 6,405,464 B1 | 6/2002 | Gulick, Jr. et al. |
| 6,414,794 B1 | 7/2002 | Rosenthal |
| 6,424,467 B1 | 7/2002 | Goggins |
| 6,433,844 B2 | 8/2002 | Li |
| 6,450,540 B1 | 9/2002 | Kim |
| 6,467,810 B2 | 10/2002 | Taylor et al. |
| 6,473,238 B1 | 10/2002 | Daniell |
| 6,483,644 B1 | 11/2002 | Gottfried et al. |
| 6,500,526 B1 | 12/2002 | Hannington |
| 6,521,324 B1 | 2/2003 | Debe et al. |
| 6,542,646 B1 | 4/2003 | Bar-Yona |
| 6,558,009 B2 | 5/2003 | Hannington et al. |
| 6,587,276 B2 | 7/2003 | Daniell |
| 6,616,803 B1 | 9/2003 | Isherwood et al. |
| 6,618,201 B2 | 9/2003 | Nishikawa et al. |
| 6,641,270 B2 | 11/2003 | Hannington et al. |
| 6,671,095 B2 | 12/2003 | Summersgill et al. |
| 6,712,399 B1 | 3/2004 | Drinkwater et al. |
| 6,721,101 B2 | 4/2004 | Daniell |
| 6,724,536 B2 | 4/2004 | Magee |
| 6,726,858 B2 | 4/2004 | Andrews |
| 6,751,024 B1 | 6/2004 | Rosenthal |
| 6,761,377 B2 | 7/2004 | Taylor et al. |
| 6,795,250 B2 | 9/2004 | Johnson et al. |
| 6,803,088 B2 | 10/2004 | Kaminsky et al. |
| 6,819,775 B2 | 11/2004 | Amidror et al. |
| 6,833,960 B1 | 12/2004 | Scarbrough et al. |
| 6,856,462 B1 | 2/2005 | Scarbrough et al. |
| 6,870,681 B1 | 3/2005 | Magee |
| 6,900,944 B2 | 5/2005 | Tomczyk |
| 6,926,764 B2 | 8/2005 | Bleikolm et al. |
| 6,935,756 B2 | 8/2005 | Sewall et al. |
| 7,030,997 B2 | 4/2006 | Neureuther et al. |
| 7,058,202 B2 | 6/2006 | Amidror |
| 7,068,434 B2 | 6/2006 | Florczak et al. |
| 7,114,750 B1 | 10/2006 | Alasia et al. |
| 7,194,105 B2 | 3/2007 | Hersch et al. |
| 7,246,824 B2 | 7/2007 | Hudson |
| 7,254,265 B2 | 8/2007 | Naske et al. |
| 7,255,911 B2 | 8/2007 | Lutz et al. |
| 7,288,320 B2 | 10/2007 | Steenblik et al. |
| 7,333,268 B2 | 2/2008 | Steenblik et al. |
| 7,336,422 B2 | 2/2008 | Dunn et al. |
| 7,359,120 B1 | 4/2008 | Raymond et al. |
| 7,372,631 B2 | 5/2008 | Ozawa |
| 7,389,939 B2 | 6/2008 | Jones et al. |
| 7,422,781 B2 | 9/2008 | Gosselin |
| 7,457,038 B2 | 11/2008 | Dolgoff |
| 7,457,039 B2 | 11/2008 | Raymond et al. |
| 7,468,842 B2 | 12/2008 | Steenblik et al. |
| 7,504,147 B2 | 3/2009 | Hannington |
| 7,545,567 B2 | 6/2009 | Tomczyk |
| 7,609,450 B2 | 10/2009 | Niemuth |
| 7,630,954 B2 | 12/2009 | Adamczyk et al. |
| 7,686,187 B2 | 3/2010 | Pottish et al. |
| 7,712,623 B2 | 5/2010 | Wentz et al. |
| 7,719,733 B2 | 5/2010 | Schilling et al. |
| 7,738,175 B2 | 6/2010 | Steenblik et al. |
| 7,744,002 B2 | 6/2010 | Jones et al. |
| 7,751,608 B2 | 7/2010 | Hersch et al. |
| 7,762,591 B2 | 7/2010 | Schilling et al. |
| 7,763,179 B2 | 7/2010 | Levy et al. |
| 7,812,935 B2 | 10/2010 | Cowburn et al. |
| 7,820,269 B2 | 10/2010 | Staub et al. |
| 7,830,627 B2 | 11/2010 | Commander et al. |
| 7,849,993 B2 | 12/2010 | Finkenzeller et al. |
| 8,027,093 B2 | 9/2011 | Commander et al. |
| 8,057,980 B2 | 11/2011 | Dunn et al. |
| 8,111,463 B2 | 2/2012 | Endle et al. |
| 8,149,511 B2 | 4/2012 | Kaule et al. |
| 8,241,732 B2 | 8/2012 | Hansen et al. |
| 8,284,492 B2 | 10/2012 | Crane et al. |
| 8,367,452 B2 | 2/2013 | Soma et al. |
| 8,514,492 B2 | 8/2013 | Schilling et al. |
| 8,528,941 B2 | 9/2013 | Dörfler et al. |
| 8,537,470 B2 | 9/2013 | Endle et al. |
| 8,557,369 B2 | 10/2013 | Hoffmüller et al. |
| 8,693,101 B2 | 4/2014 | Tomczyk et al. |
| 8,739,711 B2 | 6/2014 | Cote |
| 8,867,134 B2 | 10/2014 | Steenblik et al. |
| 8,906,184 B2 | 12/2014 | Hoffmann et al. |
| 8,908,276 B2 | 12/2014 | Holmes |
| 9,019,613 B2 | 4/2015 | Raymond et al. |
| 9,132,690 B2 | 9/2015 | Raymond et al. |
| 9,399,366 B2 | 7/2016 | Hoffmuller et al. |
| 9,592,700 B2 | 3/2017 | Raymond et al. |
| 9,701,150 B2 | 7/2017 | Raymond et al. |
| 9,802,437 B2 | 10/2017 | Holmes |
| 2001/0048968 A1 | 12/2001 | Cox et al. |
| 2002/0014967 A1 | 2/2002 | Crane et al. |
| 2002/0114078 A1 | 8/2002 | Halle et al. |
| 2002/0167485 A1 | 11/2002 | Hedrick |
| 2002/0185857 A1 | 12/2002 | Taylor et al. |
| 2003/0031861 A1 | 2/2003 | Reiter et al. |
| 2003/0112523 A1 | 6/2003 | Daniell |
| 2003/0157211 A1 | 8/2003 | Tsunetomo et al. |
| 2003/0179364 A1 | 9/2003 | Steenblik et al. |
| 2003/0183695 A1 | 10/2003 | Labrec et al. |
| 2003/0228014 A1 | 12/2003 | Alasia et al. |
| 2003/0232179 A1 | 12/2003 | Steenblik et al. |
| 2003/0234294 A1 | 12/2003 | Uchihiro et al. |
| 2004/0020086 A1 | 2/2004 | Hudson |
| 2004/0022967 A1 | 2/2004 | Lutz et al. |
| 2004/0065743 A1 | 4/2004 | Doublet |
| 2004/0100707 A1 | 5/2004 | Kay et al. |
| 2004/0140665 A1 | 7/2004 | Scarbrough et al. |
| 2004/0209049 A1 | 10/2004 | Bak |
| 2005/0094274 A1 | 5/2005 | Souparis |
| 2005/0104364 A1 | 5/2005 | Keller et al. |
| 2005/0161501 A1 | 7/2005 | Giering et al. |
| 2005/0180020 A1 | 8/2005 | Steenblik et al. |
| 2005/0247794 A1 | 11/2005 | Jones et al. |
| 2006/0003295 A1 | 1/2006 | Hersch et al. |
| 2006/0011449 A1 | 1/2006 | Knoll |
| 2006/0017979 A1 | 1/2006 | Goggins |
| 2006/0018021 A1 | 1/2006 | Tomkins et al. |
| 2006/0061267 A1 | 3/2006 | Yamasaki et al. |
| 2006/0227427 A1 | 10/2006 | Dolgoff |
| 2007/0058260 A1 | 3/2007 | Steenblik et al. |
| 2007/0092680 A1 | 4/2007 | Chaffins et al. |
| 2007/0164555 A1 | 7/2007 | Mang et al. |
| 2007/0183045 A1 | 8/2007 | Schilling et al. |
| 2007/0183047 A1 | 8/2007 | Phillips et al. |
| 2007/0273143 A1 | 11/2007 | Crane et al. |
| 2007/0284546 A1 | 12/2007 | Ryzi et al. |
| 2007/0291362 A1 | 12/2007 | Hill et al. |
| 2008/0037131 A1 | 2/2008 | Steenblik et al. |
| 2008/0067801 A1* | 3/2008 | Schilling ................ B42D 25/29 283/72 |
| 2008/0116272 A1 | 5/2008 | Giering et al. |
| 2008/0130018 A1 | 6/2008 | Steenblik et al. |
| 2008/0143095 A1 | 6/2008 | Isherwood et al. |
| 2008/0160226 A1 | 7/2008 | Kaule et al. |
| 2008/0182084 A1 | 7/2008 | Tompkin et al. |
| 2009/0008923 A1 | 1/2009 | Kaule et al. |
| 2009/0061159 A1 | 3/2009 | Staub et al. |
| 2009/0243278 A1 | 10/2009 | Camus et al. |
| 2009/0261572 A1 | 10/2009 | Bleikolm et al. |

(56) References Cited

U.S. PATENT DOCUMENTS

| | | |
|---|---|---|
| 2009/0290221 A1 | 11/2009 | Hansen et al. |
| 2009/0310470 A1 | 12/2009 | Yrjonen |
| 2009/0315316 A1 | 12/2009 | Staub et al. |
| 2010/0001508 A1 | 1/2010 | Tompkin et al. |
| 2010/0018644 A1 | 1/2010 | Sacks et al. |
| 2010/0045024 A1 | 2/2010 | Attner et al. |
| 2010/0068459 A1 | 3/2010 | Wang et al. |
| 2010/0084851 A1 | 4/2010 | Schilling |
| 2010/0103528 A1 | 4/2010 | Endle et al. |
| 2010/0109317 A1 | 5/2010 | Hoffmuller et al. |
| 2010/0177094 A1 | 7/2010 | Kaule et al. |
| 2010/0182221 A1 | 7/2010 | Kaule et al. |
| 2010/0194532 A1 | 8/2010 | Kaule |
| 2010/0208036 A1 | 8/2010 | Kaule |
| 2010/0277805 A1 | 11/2010 | Schilling et al. |
| 2010/0308571 A1 | 12/2010 | Steenblik et al. |
| 2010/0328922 A1 | 12/2010 | Peters et al. |
| 2011/0017498 A1 | 1/2011 | Lauffer et al. |
| 2011/0019128 A1 | 1/2011 | Takata |
| 2011/0019283 A1 | 1/2011 | Steenblik et al. |
| 2011/0045255 A1 | 2/2011 | Jones et al. |
| 2011/0056638 A1 | 3/2011 | Rosset |
| 2011/0109078 A1* | 5/2011 | Hoffmuller .......... B42D 25/342 283/72 |
| 2011/0179631 A1 | 7/2011 | Gates et al. |
| 2012/0019607 A1 | 1/2012 | Dunn et al. |
| 2012/0033305 A1 | 2/2012 | Moon et al. |
| 2012/0091703 A1 | 4/2012 | Maguire et al. |
| 2012/0098249 A1* | 4/2012 | Rahm .................. B42D 25/324 283/85 |
| 2012/0105928 A1 | 5/2012 | Camus et al. |
| 2012/0153607 A1 | 6/2012 | Rahm et al. |
| 2012/0194916 A1 | 8/2012 | Cape et al. |
| 2012/0243744 A1 | 9/2012 | Camus et al. |
| 2013/0003354 A1 | 1/2013 | Meis et al. |
| 2013/0010048 A1 | 1/2013 | Dunn et al. |
| 2013/0038942 A1 | 2/2013 | Holmes |
| 2013/0044362 A1 | 2/2013 | Commander et al. |
| 2013/0056971 A1 | 3/2013 | Holmes |
| 2013/0069360 A1 | 3/2013 | Power et al. |
| 2013/0154250 A1 | 6/2013 | Dunn et al. |
| 2013/0154251 A1 | 6/2013 | Jolic |
| 2014/0174306 A1 | 6/2014 | Wening et al. |
| 2014/0175785 A1 | 6/2014 | Kaule et al. |
| 2014/0353959 A1 | 12/2014 | Lochbihler |
| 2014/0367957 A1 | 12/2014 | Jordan |
| 2014/0376091 A1 | 12/2014 | Jordan et al. |
| 2015/0152602 A1 | 6/2015 | Blake et al. |
| 2016/0101643 A1 | 4/2016 | Cape et al. |
| 2016/0176221 A1 | 6/2016 | Holmes |
| 2016/0257159 A1 | 9/2016 | Attner et al. |
| 2016/0325577 A1 | 11/2016 | Jordan |
| 2017/0015129 A1 | 1/2017 | Jordan |
| 2017/0173990 A1 | 6/2017 | Cape et al. |
| 2018/0178577 A1 | 6/2018 | Lister |

FOREIGN PATENT DOCUMENTS

| | | |
|---|---|---|
| CN | 1102865 | 5/1995 |
| CN | 1126970 | 11/2003 |
| CN | 1950570 | 4/2007 |
| CN | 101019155 A | 8/2007 |
| CN | 101443692 A | 5/2009 |
| CN | 101563640 A | 10/2009 |
| CN | 101678664 | 3/2010 |
| CN | 101978292 A | 2/2011 |
| CN | 102438838 A | 5/2012 |
| CN | 103097919 A | 5/2013 |
| CN | 103477250 A | 12/2013 |
| DE | 19804858 | 8/1999 |
| DE | 19932240 | 1/2001 |
| DE | 10100692 | 8/2004 |
| DE | 102011114750 A1 | 4/2013 |
| DE | 102011115125 | 4/2013 |
| EP | 0090130 | 10/1983 |
| EP | 0092691 | 11/1983 |
| EP | 0118222 | 9/1984 |
| EP | 0156460 | 10/1985 |
| EP | 0203752 | 12/1986 |
| EP | 0253089 | 1/1988 |
| EP | 0318717 | 6/1989 |
| EP | 0415230 | 3/1991 |
| EP | 0439092 A2 | 7/1991 |
| EP | 0319157 | 7/1992 |
| EP | 0801324 | 10/1997 |
| EP | 0887699 | 12/1998 |
| EP | 0930174 | 7/1999 |
| EP | 0997750 | 5/2000 |
| EP | 1356952 | 10/2003 |
| EP | 1002640 | 5/2004 |
| EP | 1538554 | 6/2005 |
| EP | 1354925 | 4/2006 |
| EP | 1659449 | 5/2006 |
| EP | 1743778 | 1/2007 |
| EP | 1801636 | 6/2007 |
| EP | 1876028 | 1/2008 |
| EP | 1897700 | 3/2008 |
| EP | 1931827 | 1/2009 |
| EP | 2335937 | 6/2011 |
| EP | 2338682 | 6/2011 |
| EP | 2162294 | 3/2012 |
| FR | 2803939 | 7/2001 |
| FR | 2952194 | 5/2011 |
| GB | 1095286 | 12/1967 |
| GB | 2103669 | 2/1983 |
| GB | 2168372 | 6/1986 |
| GB | 2227451 | 1/1990 |
| GB | 2362493 | 11/2001 |
| GB | 2395724 | 6/2004 |
| GB | 2433470 | 6/2007 |
| GB | 2490780 | 11/2012 |
| JP | 41-004953 | 3/1941 |
| JP | 46-022600 | 6/1971 |
| JP | 04-234699 | 8/1992 |
| JP | H05-508119 | 11/1993 |
| JP | 10-035083 | 2/1998 |
| JP | 10-039108 | 2/1998 |
| JP | 11-501590 | 2/1999 |
| JP | 11-189000 | 7/1999 |
| JP | 2000-056103 | 2/2000 |
| JP | 2000-233563 | 8/2000 |
| JP | 2000-256994 | 9/2000 |
| JP | 2001-055000 | 2/2001 |
| JP | 2001-516899 | 10/2001 |
| JP | 2001-324949 | 11/2001 |
| JP | 2002-169223 A | 6/2002 |
| JP | 2003-039583 | 2/2003 |
| JP | 2003-165289 | 6/2003 |
| JP | 2003-528349 | 9/2003 |
| JP | 2003-326876 | 11/2003 |
| JP | 2004-163530 A | 6/2004 |
| JP | 2004-262144 | 9/2004 |
| JP | 2004-317636 | 11/2004 |
| JP | 2005-193501 | 7/2005 |
| JP | 2009-536885 A | 10/2009 |
| JP | 2009-262375 | 11/2009 |
| JP | 2009-274293 | 11/2009 |
| JP | 2011-502811 | 1/2011 |
| JP | 2013-537640 A | 10/2013 |
| JP | 2014-514177 A | 6/2014 |
| KR | 10-0194536 | 6/1999 |
| KR | 2002170350000 | 3/2001 |
| KR | 2003119050000 | 5/2003 |
| KR | 1005443000000 | 1/2006 |
| KR | 1005613210000 | 3/2006 |
| KR | 10-2008-0048578 | 6/2008 |
| RU | 2111125 | 5/1998 |
| RU | 2245566 | 1/2005 |
| RU | 2010101854 | 7/2011 |
| TW | 575740 | 2/2004 |
| WO | WO 1992/008998 | 5/1992 |
| WO | WO 1992/019994 | 11/1992 |
| WO | WO 1993/024332 | 12/1993 |

(56) References Cited

FOREIGN PATENT DOCUMENTS

| | | |
|---|---|---|
| WO | WO 1996/035971 | 11/1996 |
| WO | WO 1997/019820 | 6/1997 |
| WO | WO 1997/044769 | 11/1997 |
| WO | WO 1998/013211 | 4/1998 |
| WO | WO 1998/015418 | 4/1998 |
| WO | WO 1998/026373 | 6/1998 |
| WO | 1999014725 A1 | 3/1999 |
| WO | WO 1999/014725 | 3/1999 |
| WO | 1999023513 A1 | 5/1999 |
| WO | WO 1999/023513 | 5/1999 |
| WO | WO 1999/026793 | 6/1999 |
| WO | WO 1999/066356 | 12/1999 |
| WO | WO 2001/007268 | 2/2001 |
| WO | WO 2001/011591 | 2/2001 |
| WO | WO 2001/039138 | 5/2001 |
| WO | WO 2001/053113 | 7/2001 |
| WO | WO 2001/063341 | 8/2001 |
| WO | WO 2001/071410 | 9/2001 |
| WO | WO 2002/040291 | 5/2002 |
| WO | WO 2002/043012 | 5/2002 |
| WO | WO 2002/101669 | 12/2002 |
| WO | WO 2003/005075 | 1/2003 |
| WO | WO 2003/007276 | 1/2003 |
| WO | WO 2003/022598 | 3/2003 |
| WO | WO 2003/053713 | 7/2003 |
| WO | WO 2003/061980 | 7/2003 |
| WO | WO 2003/061983 | 7/2003 |
| WO | WO 2003/082598 | 10/2003 |
| WO | WO 2003/098188 | 11/2003 |
| WO | WO 2004/022355 | 3/2004 |
| WO | WO 2004/036507 | 4/2004 |
| WO | WO 2004/087430 | 10/2004 |
| WO | 2005052650 A2 | 6/2005 |
| WO | WO 2005/106601 | 11/2005 |
| WO | WO 2006/029744 | 3/2006 |
| WO | WO 2007/076952 | 7/2007 |
| WO | WO 2007/133613 | 11/2007 |
| WO | WO 2008/049632 | 5/2008 |
| WO | WO 2009/000527 | 12/2008 |
| WO | WO 2009/000528 | 12/2008 |
| WO | WO 2009/000529 | 12/2008 |
| WO | WO 2009/000530 | 12/2008 |
| WO | WO 2009/118946 | 10/2009 |
| WO | WO 2009/121784 | 10/2009 |
| WO | WO 2010/015383 | 2/2010 |
| WO | WO 2010/094691 | 8/2010 |
| WO | WO 2010/099571 | 9/2010 |
| WO | WO 2010/113114 | 10/2010 |
| WO | WO 2010/136339 | 12/2010 |
| WO | WO 2011/012460 | 2/2011 |
| WO | WO 2011/015384 | 2/2011 |
| WO | WO 2011/019912 | 2/2011 |
| WO | WO 2011/044704 | 4/2011 |
| WO | WO 2011/051669 | 5/2011 |
| WO | WO 2011/107791 | 9/2011 |
| WO | WO 2011/107793 | 9/2011 |
| WO | WO 2011/122943 | 10/2011 |
| WO | WO 2012/027779 | 3/2012 |
| WO | WO 2012/103441 | 8/2012 |
| WO | WO 2012/121622 | 9/2012 |
| WO | 2013028534 A1 | 2/2013 |
| WO | WO 2013/028534 | 2/2013 |
| WO | WO 2013/093848 | 6/2013 |
| WO | WO 2013/098513 | 7/2013 |
| WO | WO 2015/148878 | 10/2015 |
| WO | WO 2016/063050 | 4/2016 |
| WO | WO 2016/149760 | 9/2016 |

OTHER PUBLICATIONS

Drinkwater, K. John, et al., "Development and applications of Diffractive Optical Security Devices for Banknotes and High Value Documents", Optical Security and Counterfeit Deterrence Techniques III, 2000, pp. 66-77, SPIE vol. 3973, San Jose, CA.

Fletcher, D.A., et al., "Near-field infrared imaging with a microfabricated solid immersion lens", Applied Physics Letters, Oct. 2, 2000, pp. 2109-2111, vol. 77, No. 14.

Gale, M. T., et al., Chapter 6—Replication, Micro Optics: Elements, Systems and Applications, 1997, pp. 153-177.

Hardwick, Bruce and Ghioghiu Ana, "Guardian Substrate as an Optical Medium for Security Devices", Optical Security and Counterfeit Deterrence Techniques III, 2000, pp. 176-179, SPIE vol. 3973, San Jose, CA.

Hutley, M.C., et al., "The Moiré Magnifier", Pure Appl. Opt. 3, 1994, pp. 133-142, IOP Publishing Ltd., UK.

Hutley, M.C., "Integral Photography, Superlenses and the Moiré Magnifier", European Optical Society, 1993, pp. 72-75, vol. 2, UK.

Hutley, M., et al., "Microlens Arrays", Physics World, Jul. 1991, pp. 27-32.

Kamal, H., et al., "Properties of Moiré Magnifiers", Opt. Eng., Nov. 1998, pp. 3007-3014, vol. 37, No. 11.

Leech, Patrick W., et al., Printing via hot embossing of optically variable images in thermoplastic acrylic lacquer, Microelectronic Engineering, 2006, pp. 1961-1965, vol. 83, No. 10, Elsevier Publishers BV, Amsterdam, NL.

Lippmann, G., "Photgraphie—Épreuves Réversibles, Photographies Intégrals", Académie des Sciences, 1908, pp. 446-451, vol. 146, Paris.

Liu, S., et al., "Artistic Effect and Application of Moiré Patterns in Security Holograms", Applied Optics, Aug. 1995, pp. 4700-4702, vol. 34, No. 22.

Phillips, Roger W., et al., Security Enhancement of Holograms with Interference Coatings, Optical Security and Counterfeit Deterrence Techniques III, 2000, pp. 304-316, SPIE vol. 3973, San Jose, CA.

Steenblik, Richard A., et al., UNISON Micro-optic Security Film, Optical Security and Counterfeit Deterrence Techniques V, 2004, pp. 321-327, SPIE vol. 5310, San Jose, CA.

Van Renesse, Rudolf L., Optical Document Security, 1994, Artech House Inc., Norwood, MA.

Van Renesse, Rudolf L., Optical Document Security, 1998, 2nd edition, pp. 232-235, 240-241 and 320-321, Artech House Inc., Norwood, MA (ISBN 0-89006-982-4).

Van Renesse, Rudolf L., Optical Document Security, 2005, 3rd edition, pp. 62-169, Artech House Inc., Norwood, MA (ISBN 1-58053-258-6).

Wolpert, Gary R., Design and development of an effective optical variable device based security system incorporating additional synergistic security technologies, Optical Security and Counterfeit Deterrence Techniques III, 2000, pp. 55-61, SPIE vol. 3973, San Jose, CA.

Zhang, X., et al., "Concealed Holographic Coding for Security Applications by Using a Moiré Technique", Applied Optics, Nov. 1997, pp. 8096-8097, vol. 36, No. 31.

Drinkwater, K. John, et al., "Development and applications of Diffractive Optical Security Devices for Banknotes and High Value Documents", Optical Security and Counterfeit Deterrence Techniques III, 2000, pp. 66-79, SPIE vol. 3973, San Jose, CA.

Liu, S., et al., "Artistic Effects and Application of Moiré Patterns in Security Holograms", Applied Optics, Aug. 1995, pp. 4700-4702, vol. 34, No. 22.

Amidror, "A Generalized Fourier-Based Method for the Analysis of 2D Moiré Envelope-Forms in Screen Superpositions", Journal of Modern Optics (London, GB), vol. 41, No. 9, Sep. 1, 1994, pp. 1837-1862, ISSN: 0950-0340.

Dunn, et al., "Three-Dimensional Virtual Images for Security Applications", Optical Security and Counterfeit Deterrence Techniques V, (published Jun. 3, 2004), Proc. SPIE 5310, pp. 328-336.

Muke, "Embossing of Optical Document Security Devices", Optical Security and Counterfeit Deterrence Techniques V, (published Jun. 3, 2004), Proc. SPIE 5310, pp. 341-349.

Amidror, "A Generalized Fourier-Based Method for the Analysis of 2D Moiré Envelope-Forms in Screen Superpositions", Journal of Modem Optics (London, GB), vol. 41, No. 9, Sep. 1, 1994, pp. 1837-1862, ISSN: 0950-0340.

Office Action regarding Russian Application No. 2017104544/12(008106), dated Oct. 31, 2018, 6 pages.

(56) References Cited

OTHER PUBLICATIONS

Third Office Action regarding Chinese Patent Application No. 201580049896.5, dated Jan. 4, 2019, 12 pages.
China National Intellectual Property Administration, "First Office Action," Application No. CN201810391431.3, dated Jul. 29, 2019, 54 pages.
China National Intellectual Property Administration, "Fourth Office Action," Application No. CN201580049896.5, dated Sep. 3, 2019, 8 pages.
Japan Patent Office, Notice of Reasons for Rejection, Application No. JP 2017-502818, dated Jun. 25, 2019, 11 pages.
National Intellectual Property Administration, P.R. China, First Office Action and Search Report, Application No. CN201810391917.7, dated Apr. 25, 2019, 18 pages.
Indonesian Office Action in connection with Application No. ID P00201700996, dated May 27, 2019, 5 pages.
ISA/EP, International Search Report and Written Opinion of the International Searching Authority, International Application No. PCT/US2015/040745, dated Jan. 27, 2016, 32 pages.
Helmut Kipphan (ed.), "Section 2.2 Gravure Printing", Handbook of Print Media: Technologies and Production Methods, 2001, pp. 369-371, Heidelberger Druckmaschinen AG, Germany.
Lippmann, G., "Photographie—Epreuves Reversibles, Photographies Integrals", Academie des Sciences, 1908, pp. 446-451, vol. 146, Paris.
Brazil National Institute of Industrial Property, "Search Report," Application No. 112017000914-5, dated Mar. 24, 2020, 8 pages.
China National Intellectual Property Administration, "Office Action," Application No. 201580027596.7, dated Feb. 3, 2019, 58 pages.
Egyptian Patent Office, "Technical Report," Application No. EG2016091551, dated Oct. 23, 2019, 10 pages.
Intellectual Property India, "Examination report under sections 12 13 of the Patents Act, 1970 and the Patents Rules, 2003," Application No. IN201617035309, dated Nov. 28, 2019, 10 pages.
Indonesia Directorate General of Intellectual Property, "Office Action," Application No. P00201607186, dated Jan. 18, 2019, 6 pages.
Japan Patent Office, "Office Action," Application No. 2017-502936, dated Nov. 27, 2018, 7 pages.
Japan Patent Office, "Decision of Refusal," Application No. JP 2017-502936, dated Jul. 9, 2019, 5 pages.
Japan Patent Office, "Decision of Refusal," Application No. JP 2017-502818, dated Mar. 3, 2020, 5 pages.
IMPI—Mexican Institute of Industrial Property, Office Action in connection with Mexican Application No. MX/a/2016/012305, dated Jan. 17, 2020, 6 pages.
International Preliminary Report on Patentability for International Application No. PCT/US2018/035183, dated Dec. 19, 2019, 9 pages.
IP Australia, "Examination report No. 1 for standard patent application," Application No. AU 2015289606, dated Jan. 14, 2020, 2 pages.
National Intellectual Property Administration, P.R. China, "Second Office Action," Application No. 201810391917.7, dated Dec. 6, 2019, 8 pages.
Egyptian Patent Office, "Technical Report," Application No. EG 2017010085, dated Dec. 31, 2019, 11 pages.
IMPI—Mexican Institute of Industrial Property, Office Action in connection with Mexican Application No. MX/a/2017/000681, dated Dec. 16, 2019, 5 pages.
China National Intellectual Property Administration, "Second Office Action," Application No. CN201810391431.3, dated May 7, 2020, 20 pages.
China National Intellectual Property Administration, "Third Office Action," Application No. 201810391917.7, dated May 15, 2020, 7 pages.
USPTO, "Final Office Action," U.S. Appl. No. 16/596,642, dated Jul. 7, 2020, 9 pages.
Intellectual Property India, "Examination report under sections 12 & 13 of the Patents Act, 1970 and the Patents Rules, 2003," Application No. IN201717004418, dated Jun. 3, 2020, 6 pages.
Egyptian Patent Office, "Technical Report," Application No. EG 2017010085, dated Jun. 20, 2020, 3 pages.

* cited by examiner

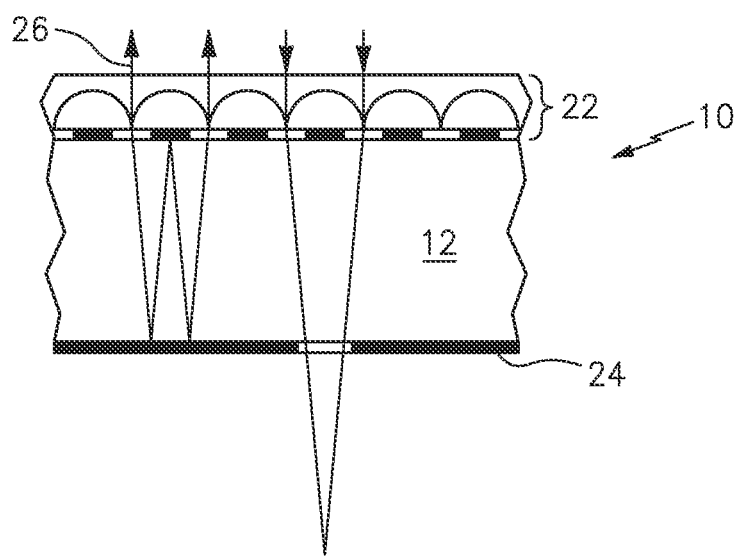
*FIG. 3(b)*
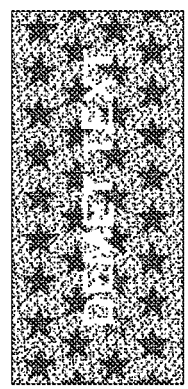      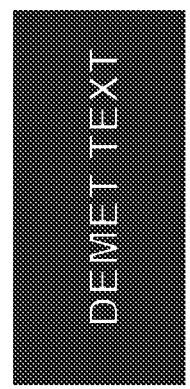
*FIG. 3(c)*      *FIG. 3(d)*      *FIG. 3(e)*

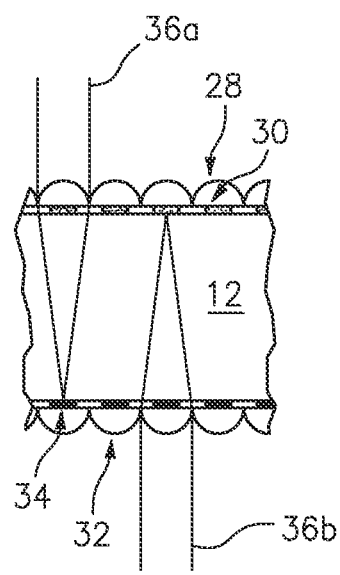 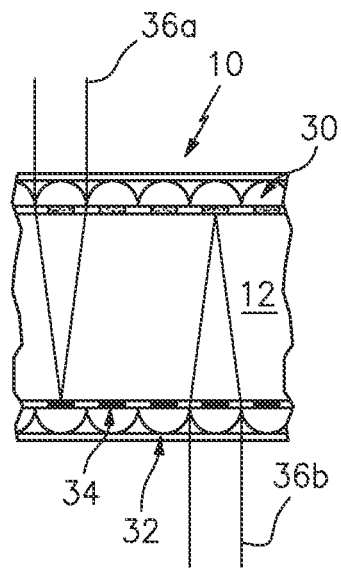 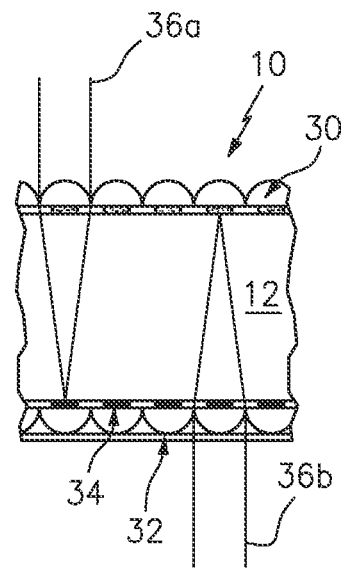
FIG. 4(a)   FIG. 4(b)   FIG. 4(c)
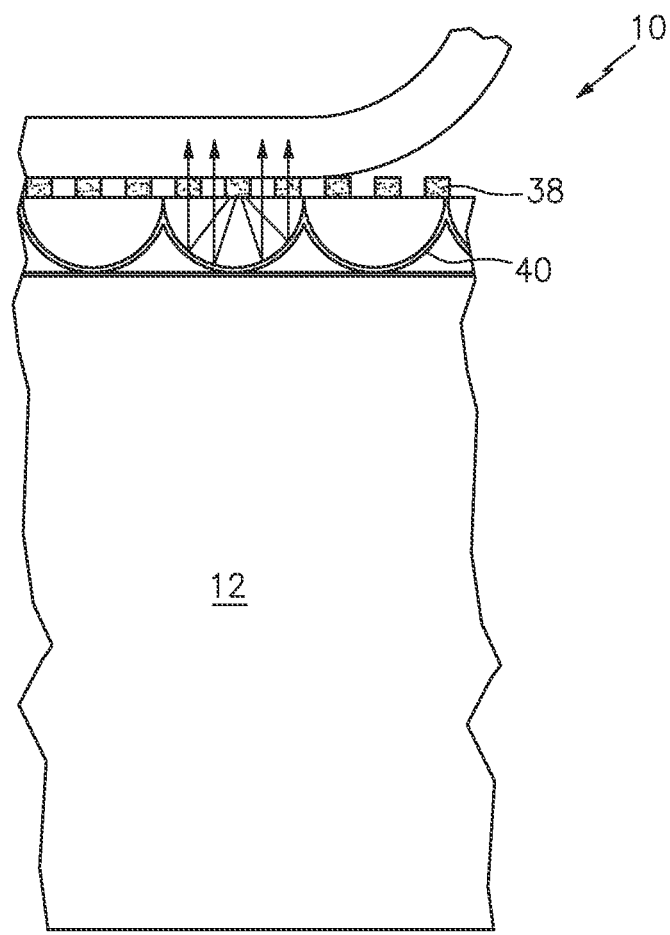
FIG. 5

POLYMERIC SHEET MATERIAL FOR USE IN MAKING POLYMERIC SECURITY DOCUMENTS SUCH AS BANKNOTES

CROSS-REFERENCE TO RELATED APPLICATIONS

This application claims benefit of and priority to U.S. Provisional Patent Application No. 62/025,637, filed on Jul. 17, 2014, which is incorporated herein by reference in its entirety.

TECHNICAL FIELD

The present invention generally relates to an improved polymeric sheet material for use in making polymeric security documents such as banknotes, which is made up of a polymer or polymeric substrate having one or more integrated and/or applied optical security devices, and to polymeric security documents made using these improved polymeric sheet materials.

BACKGROUND AND SUMMARY OF THE INVENTION

Polymeric security documents such as banknotes are typically made from a polymer such as biaxially oriented polypropylene (BOPP). Such documents offer unique opportunities to incorporate security elements that are designed to discourage counterfeiting.

One such security element is an optical security device that projects synthetic images and generally comprises an arrangement of focusing elements (e.g., microlenses or micromirrors) and an arrangement of image icons (e.g., micro-sized image icons) located on or within a polymeric substrate. The image icon and focusing element arrangements are configured such that when the arrangement of image icons is viewed through or with the arrangement of focusing elements, one or more synthetic images are projected. These projected images may show a number of different optical effects. Material constructions capable of presenting such effects are described in, for example, U.S. Pat. No. 7,333,268 to Steenblik et al., U.S. Pat. No. 7,468,842 to Steenblik el al., and U.S. Pat. No. 7,738,175 to Steenblik et al.

The arrangements of focusing elements and image icons used in these optical security devices are formed from a variety of materials such as substantially transparent or clear, colored or colorless polymers such as acrylics, acrylated polyesters, acrylated urethanes, epoxies, polycarbonates, polypropylenes, polyesters, urethanes, and the like, using a multiplicity of methods that are known in the art of micro-optic and microstructure replication, including extrusion (e.g., extrusion embossing, soft embossing), radiation cured casting, and injection molding, reaction injection molding, and reaction casting.

By way of the present invention, innovative ways of combining these optical security devices with polymer or polymeric substrates for use in making polymeric security documents (e.g., banknotes) are provided. In particular, the present invention provides an improved polymeric sheet material made up of a polymer or polymeric substrate having one or more integrated and/or applied optical security devices, the optical security device(s) being integrated and/or applied to all or part of the substrate, wherein when the optical security device(s) is positioned on or within only part or a portion of the substrate, an opacifying coating may be used to cover remaining portions thereof.

Contemplated embodiments of the improved polymeric sheet material of the present invention in the form of a polymer or polymeric substrate with either an integrated or applied optical security device are described below.

1. A polymeric sheet material in which the optical security device is an integrated feature made up of an optionally embedded arrangement(s) of focusing elements and an arrangement(s) of image icons, which are formed directly (e.g., cast) or applied (e.g., transferred with adhesive) onto all or part of opposing surfaces of the polymer or polymeric substrate, which has a thickness greater than or equal to about 60 microns, wherein the substrate serves as an optical spacer;
2. A polymeric sheet material in which the optical security device is an integrated feature made up of an optionally embedded arrangement(s) of focusing elements located on or over an arrangement(s) of image icons, which are formed directly or applied onto all or part of one surface of the polymeric substrate, and a reflective (e.g., metal) surface, which is applied to all or part of an opposing surface of the substrate and which serves to provide a reflection of the image icons beyond the reflective surface so that the focusing elements can focus on the reflection of the image icons, thus allowing for the use of focusing elements with a focal length that extends beyond the arrangement(s) of image icons;
3. A polymeric sheet material in which the optical security device is an integrated feature made up of an optionally embedded first arrangement(s) of focusing elements located on or over a first arrangement(s) of image icons, which are formed directly or applied onto all or part of one surface of the polymeric substrate, and an optionally embedded second arrangement(s) of focusing elements located on or over a second arrangement(s) of the same or different image icons, which are formed directly or applied onto all or part of an opposing surface of the substrate. Here, the focusing elements on one surface of the substrate (e.g., the first arrangement(s) of focusing elements) focus on the image icons on an opposing surface of the substrate (e.g., the second arrangement(s) of image icons). The images projected from opposing surfaces of this substrate may be the same or different, and may have the same or different colors and/or optical effects (e.g., motion or movement, depth, floating);
4. A polymeric sheet material in which the optical security device is an applied feature made up of an arrangement(s) of concave or convex reflective focusing elements and an overlying arrangement(s) of image icons, and is either formed in place on, or transferred onto one or opposing surfaces of the polymeric substrate;
5. A "fold-over" polymeric sheet material in which the optical security device is an integrated feature made up of an optionally embedded arrangement(s) of focusing elements and a first arrangement(s) of image icons, which are formed directly or applied onto remote portions of one surface of the polymeric substrate, and a second arrangement(s) of the same or different image icons, which are formed directly or applied onto an opposing surface of the substrate (preferably directly opposite the first arrangement of image icons). In a preferred embodiment in which the first and second image icon arrangements are positioned opposite each other on the substrate, the arrangement(s) of focusing elements is an optionally embedded arrangement to two differently sized focusing elements and when that portion of the sheet material containing the arrangement(s) of focusing elements is positioned directly over the portion of the sheet material containing these arrangements, two images will be projected. The two images may be the same or different, and may have the same or different colors and/or optical effects;

6. A polymeric sheet material in the form of a "two-ply" polymer or polymeric substrate with an integrated optical security device in which either (i) the arrangement(s) of focusing elements is positioned between the two plies, and one or two arrangements of the same or different image icons are formed or applied onto all or part of one or opposing surfaces of the two-ply substrate, or (ii) one or two arrangements of the same or different image icons are positioned between the two plies, and one or two optionally embedded arrangements of focusing elements are formed or applied onto all or part of one or opposing surfaces of the two-ply substrate. Here, images are projected from one or opposing surfaces of the sheet material. The images may be the same or different, and may have the same or different colors and/or optical effects;

7. A polymeric sheet material in which the optical security device is an integrated or applied feature made up of a first arrangement(s) of image icons and an underlying arrangement(s) of hybrid refractive/reflective focusing elements, that is either formed in place on, or transferred onto a surface of the polymeric substrate, and a second arrangement(s) of image icons that is either formed in place on, or transferred onto an opposing surface of the substrate, the hybrid refractive/reflective focusing elements providing means for forming an image in transmitted light and a different image in reflected light; and 8. A polymeric sheet material in which the optical security device is an applied feature made up of an optionally embedded arrangement(s) of focusing elements and an arrangement(s) of image icons, separated by a thin spacer, and is either formed in place on, or transferred onto one or opposing surfaces of the polymeric substrate.

Also provided by way of the present invention is a polymeric security document (e.g., a banknote) made using the improved polymeric sheet material described above, which has printing or other identifying indicia on one or opposing sides thereof.

Other features and advantages of the invention will be apparent to one of ordinary skill from the following detailed description. Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Matching reference numerals designate corresponding parts throughout the drawings, and components in the drawings are not necessarily to scale, emphasis instead being placed upon clearly illustrating the principles of the present disclosure. While exemplary embodiments are disclosed in connection with the drawings, there is no intent to limit the present disclosure to the embodiment or embodiments disclosed herein. On the contrary, the intent is to cover all alternatives, modifications and equivalents.

Particular features of the disclosed invention are illustrated by reference to the accompanying drawings in which:

FIG. 3(b) is a cross-sectional side view of the embodiment shown in FIG. 3(a) in which the reflective layer has been adjusted to include a demetalized "hole";

FIG. 3(c) is a top planar view of the embodiment shown in FIG. 3(b), the reflective layer adjusted to include the words "DEMET TEXT", which when placed over a white surface appear as light "missing" areas, while FIG. 3(d) is a top planar view of the embodiment shown in FIG. 3(c) placed over a dark surface, the words "DEMET TEXT" which now appear as dark "missing" areas;

FIG. 3(e) is a top planar view of the embodiment shown in FIG. 3(c) when viewed in transmitted light, the words "DEMET TEXT" appearing as light areas against an opaque background;

FIG. 4(a) is a cross-sectional side view of an embodiment of the improved polymeric sheet material of the present invention, where a first arrangement of image icons and a first arrangement of focusing elements are formed directly or applied onto one surface of the polymeric substrate, and a second arrangement of the same or different image icons and a second arrangement of focusing elements are formed directly or applied onto an opposing surface of the substrate. FIG. 4(b) is a cross-sectional side view of an embodiment similar to FIG. 4(a) but in which the focusing elements are embedded focusing elements. FIG. 4(c) is a cross-sectional side view of another embodiment similar to FIG. 4(a) but in which the focusing elements are embedded focusing elements on one side, and not embedded or open on the other side;

FIG. 5 is a cross-sectional side view of an embodiment of the inventive improved polymeric sheet material, where an optical security device in the form of an arrangement of image icons and an underlying arrangement of concave reflective focusing elements is shown being transferred onto one surface of the polymeric substrate;

DETAILED DESCRIPTION OF THE INVENTION

Figure 1:
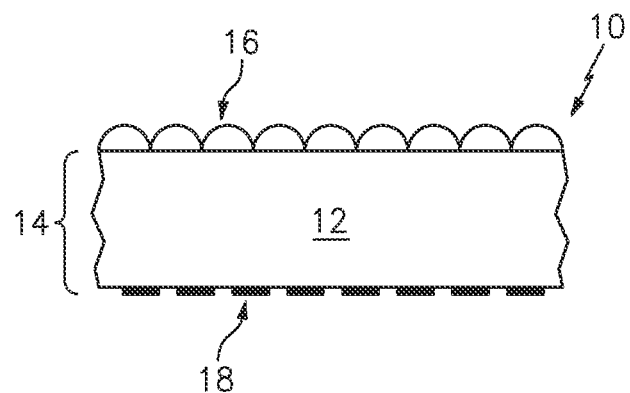
FIG. 1 is a cross-sectional side view of an embodiment of the improved polymeric sheet material of the present invention, where an arrangement of focusing elements and an arrangement of image icons are formed directly onto opposing surfaces of the polymer or polymeric substrate.

As noted above, the present invention provides an improved polymeric sheet material in the form of a polymer or polymeric substrate that has one or more integrated and/or applied optical security devices. The polymer or polymeric substrate may comprise one or more layers of transparent polymer film, preferably transparent biaxially oriented polymer film. In a more preferred embodiment, the substrate is either a single layer BOPP film, or a laminate of two or more layers of BOPP film, each of which is coated with a heat-activated adhesive layer. The polymer or polymeric substrate typically ranges from greater than or equal to about 60 microns (preferably, from about 60 to about 90 microns) in total thickness.

For those embodiments in which the optical security device(s) is integrated and/or applied to only part of the substrate, an opacifying coating may be used to cover remaining portions thereof. The opacifying coating is made up of a major portion (≥50%) of pigment and a minor portion (<50%) of a cross-linked polymeric binder.

For those embodiments in which the optical security device(s) is integrated and/or applied to the entire substrate, an opacifying coating may or may not be used. As will be readily appreciated by those skilled in the art, such a sheet material would be used to make an entirely micro-optic security document or banknote, which presents a number of distinct and unique advantages.

The optical security device of the inventive polymeric sheet material basically comprises one or more arrangements of optionally embedded cylindrical or non-cylindrical focusing elements and one or more arrangements of image icons. As noted above, these arrangements are configured such that when the arrangement of image icons is viewed through the arrangement of focusing elements, one or more synthetic images are projected.

The optionally embedded focusing elements used in the practice of this invention include, but are not limited to, refractive focusing elements, reflective focusing elements, hybrid refractive/reflective focusing elements, and combinations thereof. In one contemplated embodiment, the focusing elements are refractive microlenses. Examples of suitable focusing elements are disclosed in U.S. Pat. No. 7,333,268 to Steenblik et al., U.S. Pat. No. 7,468,842 to Steenblik el al., and U.S. Pat. No. 7,738,175 to Steenblik et al., all of which are fully incorporated by reference as if fully set forth herein.

The focusing elements have preferred widths (in the case of cylindrical lenses) and base diameters (in the case of non-cylindrical lenses) of either (i) less than or equal to 1 millimeter including widths/base diameters ranging from about 200 to about 500 microns and ranging from about 50 to about 199 microns, or (ii) less than about 50 microns including widths/base diameters ranging from less than about 45 microns and ranging from about 5 to about 40 microns.

Embedment of the focusing elements serves to improve the optical security device's resistance to optically degrading external effects. In one such embodiment, the refractive index from an outer surface of the optical security device to refracting interfaces is varied between a first and a second refractive index, the first refractive index being substantially or measurably different than the second refractive index. The phrase "substantially or measurably different", as used herein, means a difference in refractive index that causes the focal length(s) of the focusing elements to change at least about 0.1 micron.

The embedding material may be transparent, translucent, tinted, or pigmented and may provide additional functionality for security and authentication purposes, including support of automated currency authentication, verification, tracking, counting and detection systems, that rely on optical effects, electrical conductivity or electrical capacitance, magnetic field detection. Suitable materials can include adhesives, gels, glues, lacquers, liquids, molded polymers, and polymers or other materials containing organic or metallic dispersions.

The image icons may be printed on the polymer or polymeric substrate or may constitute microstructured image icons that are raised or recessed relative to a surface of the substrate. In a preferred embodiment, the image icons are formed as either voids or recesses on or within the substrate, or raised relative to the substrate. In either case, the image icons may be formed by casting or heat pressure processes.

In one embodiment contemplated by the present invention, the image icons are optionally coated and/or filled voids or recesses formed on or within the polymer or polymeric substrate. The voids or recesses may each measure from about 0.5 to about 8 microns in total depth and greater than or equal to about 0.5 microns in total width.

Exemplary embodiments of the inventive polymeric sheet material will now be disclosed in connection with the drawings. There is no intent, however, to limit the present disclosure to the embodiments disclosed herein. On the contrary, the intent is to cover all alternatives, modifications and equivalents.

In a first exemplary embodiment, which is best shown in FIG. 1, the improved polymeric sheet material of the present invention 10 is in the form of a polymer or polymeric substrate 12 with an integrated optical security device 14, the integrated device 14 made up of an arrangement of focusing elements (i.e., refractive microlenses) 16 and an arrangement of image icons 18, which are formed directly onto opposing surfaces of the substrate 12. Here, substrate 12 contributes to the optical functionality of the integrated optical security device 14, by serving as an optical spacer.

The refractive microlenses 16 each have a focal length such that the image icons 18 on the opposing side of the substrate 12 substantially intersect with a portion of their depth of focus, when viewed normal to the surface. These refractive microlenses 16 may have cylindrical, spheric or aspheric surfaces.

As noted above, the image icons may be formed from a printing method, or from voids or solid regions in a microstructure. In a preferred embodiment, the image icons are formed from optionally coated and/or filled voids or recesses on or within the substrate, the voids or recesses each measuring from about 0.5 to about 8 microns in total depth and greater than or equal to about 0.5 microns in total width. The voids or recesses may be filled or coated with a material having a different index of refraction than the surrounding or underlying material, a dyed material, a metal, or a pigmented material (e.g., a submicron particle pigmented coloring material). Such an approach has the benefit of almost unlimited spatial resolution.

As also noted above, the arrangements of focusing elements 16 and image icons 18 may be formed from a variety of materials such as substantially transparent or clear, colored or colorless polymers such as acrylics, acrylated polyesters, acrylated urethanes, epoxies, polycarbonates, polypropylenes, polyesters, urethanes, and the like.

In an exemplary method of manufacture, the image icons are formed as voids in a radiation cured liquid polymer (e.g., acrylated urethane) that is cast from an icon mold against the substrate 12. The image icon voids are then filled with a submicron particle pigmented coloring material by gravure-like doctor blading against the polymeric icon surface. The fill is then solidified by suitable means (e.g., solvent removal, radiation curing, or chemical reaction). Then, the lenses are cast against an opposing side of the substrate 12 by bringing that side against a lens mold filled with radiation curable polymer. The polymer is then solidified by application of ultraviolet (UV) light or other actinic radiation.

The integrated optical security device 14 in this exemplary embodiment and the integrated or applied optical security devices of the following exemplary embodiments may adopt any size or shape. For example, they may be formed in the shape of a patch, stripe (band or thread), or co-extensive layer.

Figure 2:
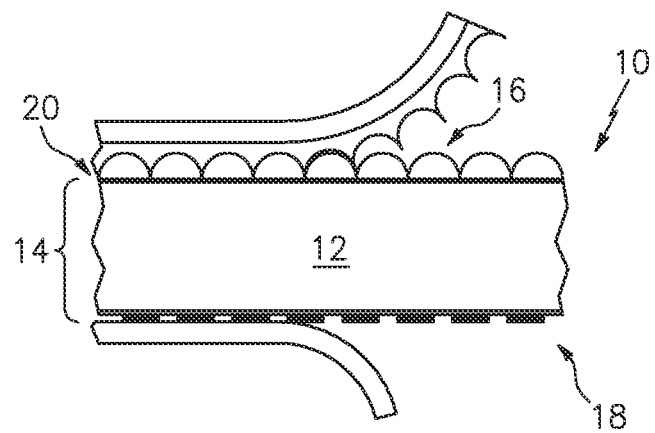
FIG. 2 is a cross-sectional side view of an embodiment similar to FIG. 1, but where the arrangement of focusing elements and the arrangement of image icons are transferred onto opposing surfaces of the substrate.

In a second exemplary embodiment, which is best shown in FIG. 2, the arrangement of refractive microlenses 16 and the arrangement of image icons 18 are transferred onto all or part of opposing surfaces of the substrate 12.

An exemplary method of forming these transferable focusing element and image icon layers comprises:

forming a microstructure-bearing release liner comprising a "lens mold" layer adhered to a carrier film (e.g., a UV transmissive carrier film), wherein the "lens mold" layer is formed from a curable resin having a plurality of voids with negative lens geometries, the negative lens geometries being made by UV curing the resin against a rigid surface having positive lens geometries (i.e., a positive lens mold);

filling the plurality of voids with an optically functional UV curable liquid polymer (e.g., polyester acrylate), applying pressure with a nip roller to exclude excess liquid polymer, and simultaneously exposing the liquid polymer to UV radiation such that the UV curable polymer cures or hardens and can be lifted from the lens mold;

applying a curable resin material to a surface of a release liner (e.g., a smooth or non-structured carrier substrate having a functional release coating) and curing the surface against a rigid icon mold to form one or more arrangements of image icons in the form of voids within a surface of the curable resin material;

filling the voids with a material providing a contrast with the curable resin material to form a filled image Icon layer; and applying one or more adhesive layers (e.g., tack free thermally activated adhesive layers) to the transferable layers.

Once prepared, the transferable layers may be handled like a traditional transfer foil, that is, the material can be wound and unwound from a roll and further converted into a suitable final shape such as a patch, stripe (band or thread), or sheet by converting methods common in the security printing and packaging industries. In order to transfer the focusing element layer 16 and image icon layer 18 from the release liners, the adhesive side of each transferable layer is placed in contact with opposing sides of the polymer or polymeric substrate 12. Heat and/or pressure is applied causing the adhesive in adhesive layer 20 to bond securely to substrate 12. Then, the release liner with "lens mold" layer and the other release liner are peeled away, leaving behind the desired focusing element and image icon layers.

Figure 3A:
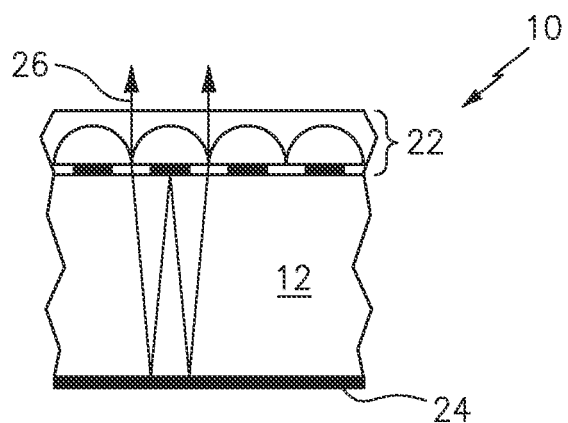
FIG. 3(a) is a cross-sectional side view of an embodiment of the improved polymeric sheet material of the present invention, where an arrangement of image icons and an overlying embedded arrangement of focusing elements are located on a top surface of the polymeric substrate, and a reflective layer is located on a bottom surface of the substrate.

In a third exemplary embodiment, which is best shown in FIG. 3(a), the inventive polymeric sheet material 10 employs an integrated optical security device in the form of a film material 22 made up of an arrangement of image icons and an overlying optionally embedded arrangement of focusing elements that are located on a top surface of the polymer or polymeric substrate 12, and a reflective layer 24 (e.g., a vapor deposited metal layer) that is located directly below on a bottom surface of the substrate 12. As noted above, in this embodiment, the reflective layer 24 serves to provide a reflection of the image icons beyond the reflective surface so that the focusing elements can focus on the reflection of the image icons, thus allowing for the use of focusing elements with a focal length that extends beyond the arrangement(s) of image icons.

The film material 22 may be formed in place on the substrate 12 or the film material (with one or more adhesive layers) may be transferred to the substrate as a transfer film using previously noted techniques including mechanical, chemical, thermal and photo-induced separation techniques. The concept of separation of desired components from a carrier substrate is known in the art of holographic foil transfer, whereby a film with a release coating (i.e., release liner) is provided with optical coatings and adhesives, such that the optical coatings and adhesives can be transferred to a final substrate with application of heat and pressure.

Reflective layer 24 may be a vapor deposited metal layer. Metallization may be achieved, for example, by evaporated or sputtered aluminum, gold, rhodium, chromium, osmium, depleted uranium or silver, by chemically deposited silver, or by multi-layer interference films. This layer may contain image icons formed from patterned demetallization, or holographic features. In this exemplary embodiment, the focusing elements focus on the reflection of icons.

In a preferred embodiment, the reflective layer 24 is a patterned metal layer in which image icons (secondary image icons), which are positive or negative in relation to their background, are formed by patterned demetallization. The demetalized pattern or secondary image icons may adopt any form including, but not limited to, positive text, negative text, imagery, line work, and the like. These secondary image icons control which focusing elements will see a reflection and which focusing elements will not. By providing this control, a second image—one which blocks light and allows a clear image to be seen in transmitted light, is provided. This will be a static image, and not a synthetic image (e.g., a moving or three dimensional synthetic image).

The visual effect achieved by this preferred embodiment will be described in conjunction with FIGS. 3(b) 3(e). In FIG. 3(b), reflective layer 24 is adjusted to include demetalized "holes" (only one demetalized "hole" is shown in FIG. 3(b)). As a result, light passes straight through the optics in those areas. When looking at the inventive sheet material, one would see one or more synthetic images with missing bits where the "holes" are located. Depending on the color of the underlying substrate (or its transparency), the missing bits may appear to be light "missing" areas, or dark "missing" areas. By way of example, and as best shown in FIGS. 3(c), (d), (e), the reflective layer is adjusted to include the words "DEMET TEXT". In FIG. 3(c), these words are shown as light "missing" areas, which is indicative of the inventive polymeric sheet material being placed over a white surface (e.g., a white polymeric surface) or over a paper substrate. This effect may also be indicative of the inventive sheet material being viewed in a combination of reflected and transmitted light. In FIG. 3(d), these words are shown as dark "missing" areas, which is indicative of the sheet material being placed over a transparent polymer or polymeric substrate that is held against a dark background (shown in reflected light). As shown in FIG. 3(e), when the inventive sheet material is viewed in transmitted light, the micro-optic areas will be opaque (due to the presence of the metal reflective layer) and the demetalized areas (i.e., the words "DEMET TEXT") will appear light.

In a fourth exemplary embodiment, one version of which is shown in FIG. 4(a), the inventive polymeric sheet material 10 employs an integrated optical security device made up of a first arrangement of focusing elements 28 and a first arrangement of image icons 30, which are formed directly or applied onto all or part of one surface of the substrate 12, and a second arrangement of focusing elements 32 and a second arrangement of the same or different image icons 34, which are formed directly or applied onto all or part of an opposing surface of the substrate 12. Here, the focusing elements on one surface of the substrate 12 focus on the image icons on an opposing surface of the substrate. This embodiment is a two-sided embodiment displaying a different and/or different color image 36a, 36b on the front and back. In FIG. 4(b), the focusing elements are embedded focusing elements.

If one were to make this sheet material using the same focusing elements or lenses (lenses in arrangement 28 and in arrangement 32), then these lenses would image one another, forming a moiré pattern of the lenses themselves, which would be visible from both sides. In order to avoid this effect, the inventive polymeric sheet material 10 shown in FIGS. 4(a) and 4(b) includes:

(A) The use of an arrangement of non-embedded or open lenses on each side of the substrate (see FIG. 4(a)) with each lens arrangement having one or more of the following:
  a. a different rotation angle of the lens arrangement (preferably a rotation angle designed to minimize moiré effects) (i.e., a rotation angle that is different from the rotation angle of the other lens arrangement). Typically, an angle of 1-2 degrees or slightly more will de-magnify any moiré effects sufficiently so that the moiré effect of the lenses looking upon lenses will be very small in size compared with any desired synthetic image. The angle can be adjusted further, if desired, but increasing the angle too much may reveal a new moiré image;
  b. a different lattice structure or lens pattern (e.g., circular, triangular, square, or hexagonal lens array pattern) (i.e., a lattice structure that is different from the lattice structure of the other lens arrangement) such as the top lenses in arrangement 28 being such that they lie on a hexagonal grid, but the bottom lenses in arrangement 32 being such that they lie on a rectangular or square grid; or
  c. a different pitch (i.e., a pitch that is different from the pitch of the other lens arrangement), (B) the use of an arrangement of embedded or sealed lenses on each side of the substrate (see FIG. 4(b)) with each lens arrangement having one or more of the following:
  a. a different rotation angle of the lens arrangement (preferably a rotation angle designed to minimize moiré effects) (i.e., a rotation angle that is different from the rotation angle of the other lens arrangement). Typically, an angle of 1-2 degrees or slightly more will de-magnify any moiré effects sufficiently so that the moiré effect of the lenses looking upon lenses will be very small in size compared with any desired synthetic image. The angle can be adjusted further, if desired, but increasing the angle too much may reveal a new moiré image;
  b. a different lattice structure or lens pattern (e.g., circular, triangular, square, or hexagonal lens array pattern) (i.e., a lattice structure that is different from the lattice structure of the other lens arrangement) such as the top lenses in arrangement 28 being such that they lie on a hexagonal grid, but the bottom lenses in arrangement 32 being such that they lie on a rectangular or square grid; or
  c. a different pitch (i.e., a pitch that is different from the pitch of the other lens arrangement), In the above cases, having a different pitch may be difficult to achieve as an "only" solution, because changing the pitch inevitably either spaces out the lenses further from one another (causing loss in optical efficiency), or it requires a change in the radius of curvature of the lenses (which isn't always a parameter that can be changed dramatically). When considering this problem, the present inventors arrived at a more preferred embodiment, which is shown in FIG. 4(c). By way of this more preferred embodiment, the inventive polymeric sheet material 10 employs an arrangement of non-embedded or open lenses on one side of the substrate, and embedded or sealed lenses on the other side. This arrangement greatly changes the pitch difference between the two focusing element systems. It also has the interesting consequence that one side of the sheet material 10 will be slightly "textured" while the other side will be perfectly smooth. This effect constitutes a useful secondary (semi-forensic) authentication feature.

In a fifth exemplary embodiment, which is best shown in FIG. 5, the inventive polymeric sheet material 10 is in the form of polymer or polymeric substrate 12 with an applied optical security device that is made up of an arrangement of image icons 38 and an underlying arrangement of concave reflective focusing elements 40, that are transferred onto one surface of the substrate 12.

The inventive sheet material 10 in this fifth exemplary embodiment, is engineered around the bond strength between the arrangement of image icons 38 and a release liner. This bond strength must be less than the bond strength between an adhesive which would be located between the arrangement of concave reflective focusing elements 40 and the substrate 12. The reason for the different bond strength requirements is that for some embodiments of the present invention the release liner must "release" from the sheet material 10 once the sheet material has been applied to the substrate 12. For other embodiments where more abrasion resistance is desired, the release liner would remain in place on the applied polymeric sheet material 10 and therefore would not need to "release" from the sheet material 10.

An exemplary method of manufacturing an exemplary embodiment of this transferable thin (reflective) optical security device comprises:

applying a curable resin material to a surface of a release liner (e.g., a smooth or non-structured carrier substrate having a functional release coating) and curing the surface against a rigid icon mold to form one or more arrangements of image icons in the form of voids within a surface of the curable resin material;

filling the voids with a material providing a contrast with the curable resin material to form a filled image icon layer;

applying a curable resin material to a surface of the filled image icon layer and curing the resin against a rigid surface having negative lens geometries (i.e., a negative lens mold) forming one or more arrangements of focusing elements on a surface of the curable resin material;

applying a conformal coating of metal or other reflective material to the focusing elements to form one or more arrangements of reflective focusing elements;

optionally applying one or more protective coating layers to the one or more arrangements of reflective focusing elements; and applying one or more adhesive layers (e.g., tack free thermally activated adhesive layers) to the one or more optionally protective coated arrangements of reflective focusing elements.

The resulting film-like structure can be handled/converted/transferred like a traditional transfer film. In other words, the converted structure may be brought into contact with the polymer or polymeric substrate 12, and upon the application of heat and pressure, the release liner can be completely peeled away, leaving only the thin (reflective) transfer product on one side of the substrate 12.

Figure 6A:
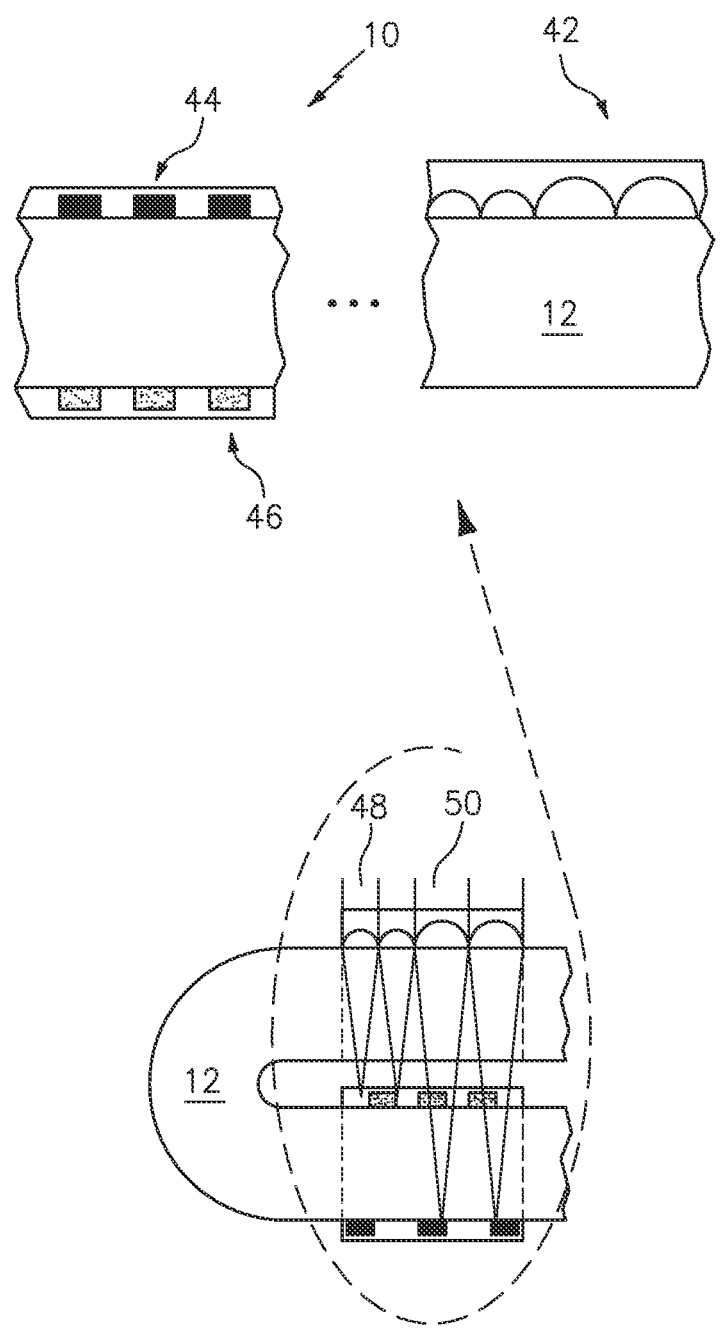
FIG. 6(a) is a cross-sectional side view of a "fold-over" embodiment of the inventive polymeric sheet material, where an integrated optical security device is made up of an embedded or sealed arrangement of focusing elements having two different sizes and a first arrangement of image icons placed in remote locations on one surface of the polymeric substrate, and a second arrangement of different image icons on an opposing surface of the substrate directly opposite the first arrangement of image icons, wherein both the first and second arrangements of image icons are viewed simultaneously.

In a sixth exemplary embodiment, which is best shown in FIG. 6(a), the inventive polymeric sheet material is a "fold-over" polymeric sheet material 10 in the form of polymer or polymeric substrate 12 with an integrated optical security device made up of an embedded or sealed arrangement of two different sized focusing elements 42 and a first arrangement of image icons 44, which are formed directly or applied onto remote portions of one surface of the substrate 12, and a second arrangement of different image icons 46, which is formed directly or applied on an opposing surface of the substrate 12 directly opposite the first arrangement of image icons 44. This embodiment, which makes use of different sized focusing elements with different focal lengths, allows for both arrangements of image icons (44, 46) to be viewed simultaneously. When the portion of the substrate containing the embedded arrangement of focusing elements 42 is positioned directly over the portion of the substrate containing the first and second arrangements of image icons 44, 46, two different images 48, 50 will be projected. Here, the "same side" image 48 would be seen from "farther away", and the "opposite side" image 50 would be seen "more closely".

Figure 6B:
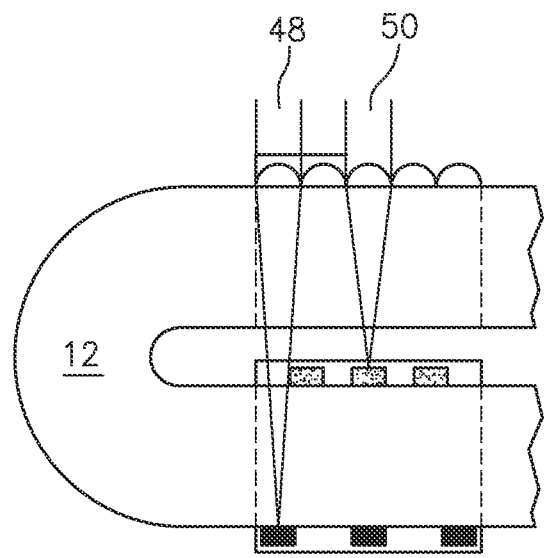
FIG. 6(b) is a cross-sectional side view of an embodiment similar to FIG. 6(a) but in which the focusing elements are the same size with some focusing elements embedded or sealed while other focusing elements are non-embedded or open, wherein again both the first and second arrangements of image icons are viewed simultaneously.

In a similar embodiment shown in FIG. 6(b), similarly sized focusing elements are used, some of which are embedded or sealed while others are not. This particular embodiment has the advantage of being able to "print" the embedding or sealing material after (and not during) production of the inventive sheet material, in a defined pattern, perhaps with a varnish or transparent material in a silkscreen. This printing can be done on a printing press at the same time the rest of substrate 12 (e.g., a banknote) is printed.

Figure 6C:
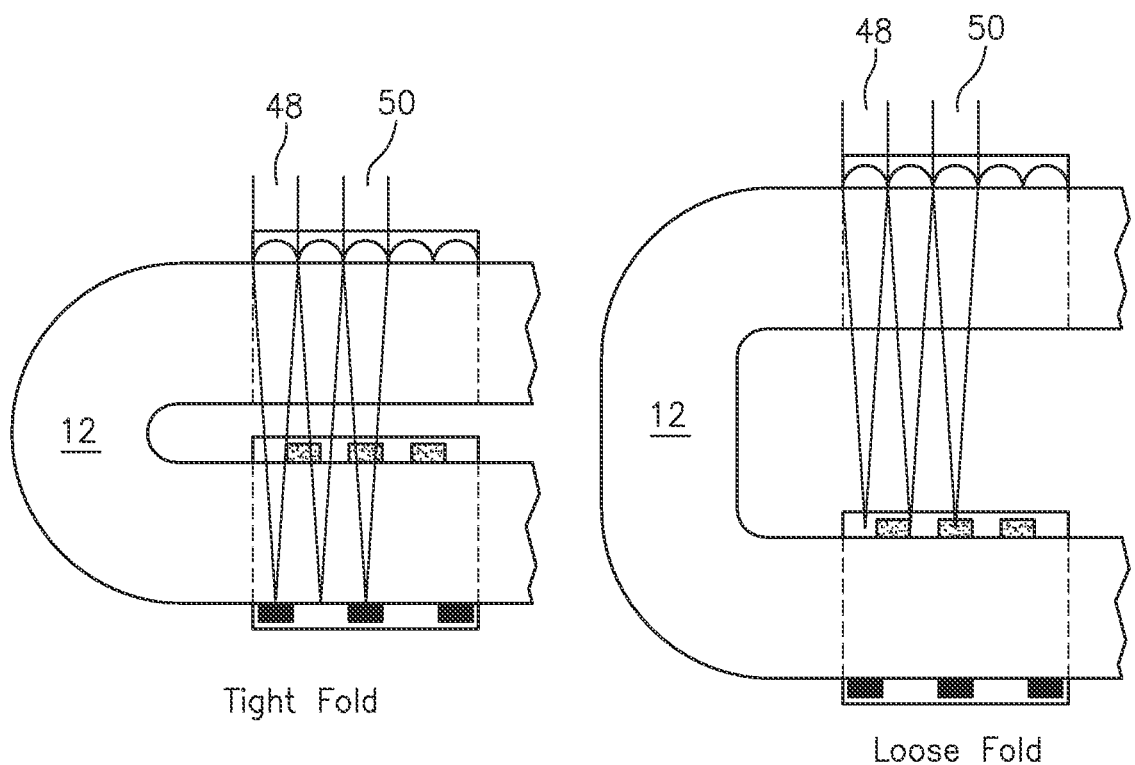
FIG. 6(c) is a cross-sectional side view of another embodiment similar to FIG. 6(a) but in which the focusing elements are the same size, embedded or sealed and tuned to image the image icons on the same side of the substrate when the substrate is folded tightly, and to image the icons on the opposite side of the substrate when the substrate is folded loosely.

In another similar embodiment, which is best shown in FIG. 6(c), the focusing elements have a focal length that is tuned to image the image icons on the same side of the substrate 12 (e.g., banknote) when the banknote is folded tightly, and to image the icons on the opposite side of the banknote when it is folded loosely. That is, there is an ability of the user to control the placement of the image icons by folding the banknote and pressing the folded part directly against the other half, versus loosely folding the banknote, and allowing some air gap to exist such that the nearer image icons are placed in the focal plane of the focusing elements or lenses. This embodiment can be combined with any of the aforementioned combination lenses, where some of the lenses (the longer focal length lenses) can exhibit this squeeze-fold effect.

Figure 7:
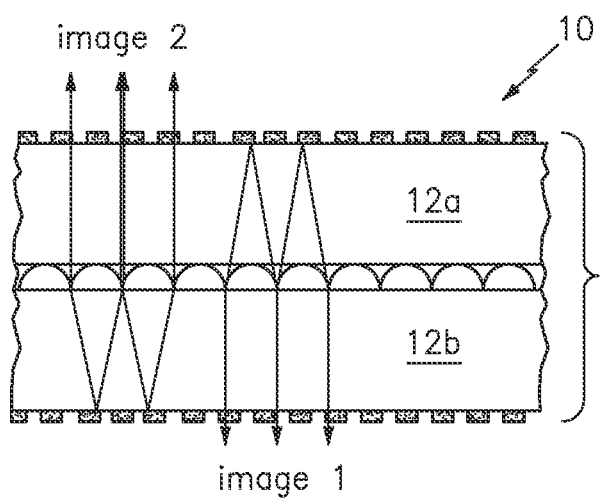
FIG. 7 is a cross-sectional side view of an embodiment of the improved polymeric sheet material in the form of a "two-ply" polymer or polymeric substrate with an integrated optical security device in which the arrangement of focusing elements is positioned between the two plies, and first and second arrangements of the same or different image icons are located on opposing surfaces of the two-ply substrate.

In a seventh exemplary embodiment, which is best shown in FIG. 7, the inventive polymeric sheet material 10 is in the form of a "two-ply" polymer or polymeric substrate 12a, 12b with an integrated optical security device in which an arrangement of focusing elements is positioned between the two plies, and first and second arrangements of the same or different image icons are formed or applied to all or part of opposing surfaces of the two-ply substrate. Here, one or more images are projected from opposing surfaces of the substrate. In another exemplary embodiment (not shown), one or more arrangements (e.g., first and second arrangements) of the same or different image icons are positioned between the two plies, and an optionally embedded arrangement of focusing elements is formed or applied to all or part of one or opposing surfaces of the two-ply substrate.

In an eighth exemplary embodiment, the inventive polymeric sheet material 10 has a hybrid refractive/reflective optical security device formed or applied onto a surface of the substrate 12.

Figure 8A:
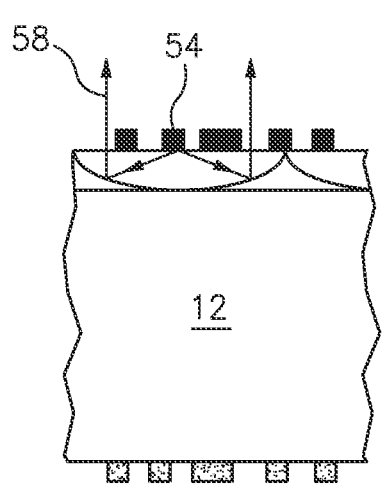
FIGS. 8(a),(b),(c) are cross-sectional side views of an embodiment of the improved polymeric sheet material of the present invention, where an applied optical security device in the form of two arrangements of image icons overlying and underlying an arrangement of "lightly metalized" hybrid refractive/reflective focusing elements are shown. The sheet material viewed in reflected light is shown in FIG. 8(a), while the sheet material viewed with a bright light directed toward the "back" of the substrate is shown in FIG. 8(b).
Figure 8B:
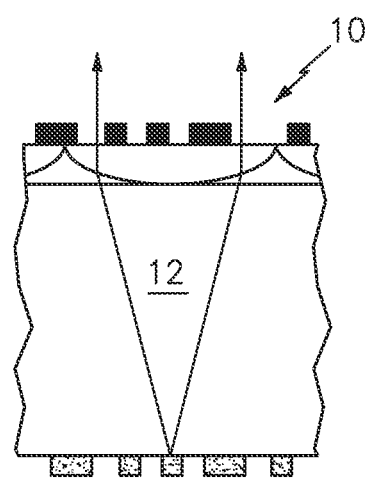
In FIG. 8(c), the inventive sheet material, when used as a fold-over feature with remotely spaced image icons on the "top" of the substrate, is shown viewed with a bright light directed toward the "top" of the substrate.
Figure 8C:
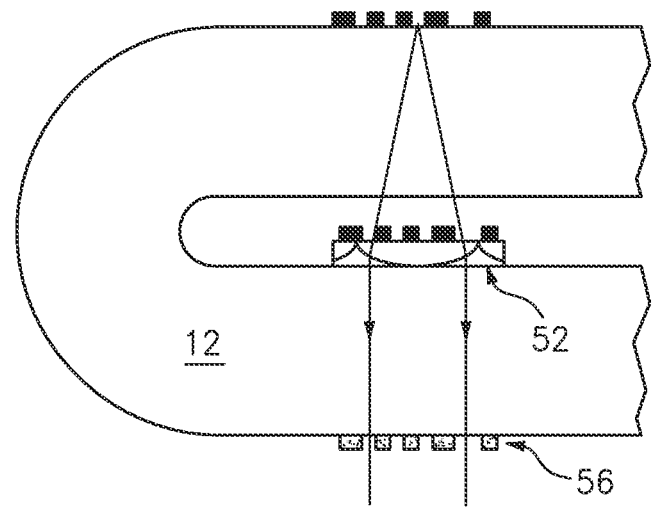

As best shown in FIGS. 8(a)-(c), an arrangement of "lightly metalized" hybrid refractive/reflective focusing elements 52 is positioned below a first arrangement of image icons 54 and above a second arrangement of image icons 56. The focusing elements 52 are "lightly metalized" so that they are partially reflective and partially transparent. In other words, the focusing element or lens surfaces have been given a vapor deposition of a reflective metal. The layer thickness of the material chosen will have an impact on the reflectance and transmittance of light with respect to the lens. When using silver, if the layer thickness is high, say above 20 nanometers (nm), the transmittance will be quite low, making the device nearly completely opaque. The desired layer thickness of the metal is below 10 nm, preferably around 5 nm, to provide a balance of reflectance and transmittance. The right balance is found, for a particular metal, when the reflected synthetic images can be clearly seen in normal "room" lighting conditions, and the transmitted synthetic images can be seen clearly when the material is backlit using readily available environmental light, such as a fluorescent light used in a building or home. This readily available light, such as a lightbulb or tube light, is considered to be a relatively bright light source, and will overwhelm the reflected mode and allow the user to see the transmitted mode. This is the same principle by which a one-way mirror operates. As previously noted, metallization may be achieved, for example, by evaporated or sputtered aluminum, gold, rhodium, chromium, osmium, depleted uranium or silver, by chemically deposited silver, or by multi-layer interference films.

By way of this embodiment, a different optical effect may be viewed in reflected and transmitted light. Referring to FIG. 8(a), in reflection mode (i.e., no bright light coming from the "top" or "back" of substrate 12), "lightly metalized" hybrid refractive/reflective focusing elements 52 act as reflective focusing elements. The image icon layer containing the first arrangement of image icons 54 lies between the viewer's eyes (not shown) and the "lightly metalized" focusing elements 52. Light scattered from the image icons is reflected from/projected by the "lightly metalized" focusing element layer, passing through the icon layer toward the viewer. The icon layer is maintained at a distance equal to the focal length of the "lightly metalized" focusing elements 52.

As shown in FIGS. 8(b) and 8(c), relatively bright light used in transmission mode will overwhelm the reflective mode. In FIG. 8(b), relatively bright light (similar to that used to view a watermark) is directed toward the "back" of the substrate 12. The light is bright enough to "pass through" the substrate 12 and the "lightly metalized" focusing elements 52, which now act like refractive focusing elements. These focusing elements focus on the second arrangement of image icons 56 located on the "back" of substrate 12. In FIG. 8(c), relatively bright light is directed toward the "top" of the substrate 12. Here, the "lightly metalized" focusing elements 52 are again acting like refractive focusing elements but the focal point or focal plane now lies beyond or above the "top" of the substrate. This embodiment may be used as a fold-over feature by using remotely placed image icons on the "top" of the substrate. The substrate may then be folded so as to place these image icons on or within the focal plane that now lies beyond the "top" of the substrate, the resulting projected images being viewable from the "back" of the substrate.

Figure 9:
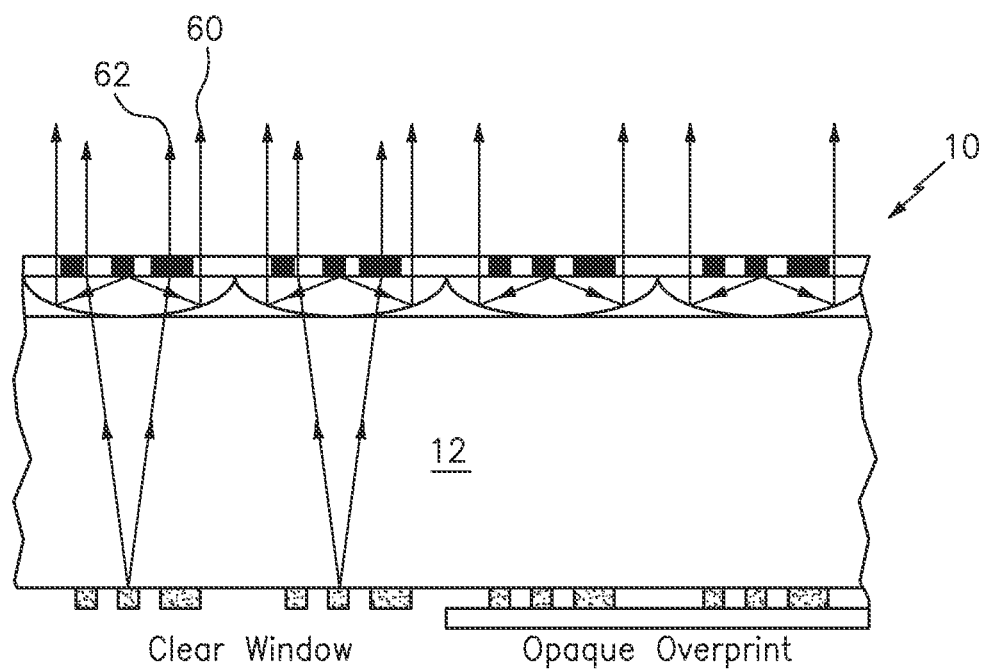
FIG. 9 is a cross-sectional side view of an embodiment similar to FIGS. 8(a),(b),(c), which employs different color image icons on opposing surfaces of the polymeric substrate and an opaque overprint on a portion of the image icons underlying the arrangement of "lightly metalized" hybrid refractive/reflective focusing elements on an opposing side of the substrate.

In FIG. 9, an embodiment is depicted that is similar to that shown in FIG. 8. Two different color images are projected by the inventive polymeric sheet material 10, a reflected light view 60 and a transmitted light view 62. Opaque overprint as well as a clear window is shown on the arrangement of image icons in this drawing, with the clear window allowing for a transmitted light view, which can overwhelm the reflected light view.

Visual effects demonstrated by each of the above described embodiments include, but are not limited to, motion or movement, orthoparallactic motion (OPM), Deep, Float, Levitate, Morph, and 3-D. These effects are fully described in U.S. Pat. No. 7,333,268 to Steenblik et al., U.S. Pat. No. 7,468,842 to Steenblik et al., and U.S. Pat. No. 7,738,175 to Steenblik et al., which, as noted above, are all fully incorporated herein by reference.

While various embodiments of the present invention have been described above, it should be understood that they have been presented by way of example only, and not limitation. Thus, the breadth and scope of the present invention should not be limited by any of the exemplary embodiments.

What is claimed is:

1. An improved polymeric sheet material for use in making polymeric security documents, which is made up of a polymer or polymeric substrate having a thickness greater than or equal to 60 microns and one or more integrated or applied optical security devices which project one or more synthetic images, the one or more optical security devices being integrated to all or part of the polymer or polymeric substrate, wherein the polymer or polymeric substrate is substantially transparent, wherein, the improved polymeric sheet material has one or more integrated optical security devices, wherein the one or more integrated optical security devices is made up of an arrangement of image icons and a directly overlying arrangement of focusing elements that are located on an upper surface of the polymer or polymeric substrate, and a reflective layer that is located directly below the arrangement of image icons and the directly overlying arrangement of focusing elements on a lower surface of the polymer or polymeric substrate, wherein the reflective layer is a patterned metal layer comprising secondary image icons formed by patterned demetallization, the patterned demetallization defining demetallized holes through which light passes through the reflective layer the polymer or polymeric substrate and wherein the demetallized holes transmit light from behind the improved polymeric sheet material, the transmitted light appearing as one or more missing areas within the synthetic images.

2. A polymeric security document made using the improved polymeric sheet material of claim 1.

3. The improved polymeric sheet material of claim 1, the secondary image icons selected from a group comprising positive text, negative text, imagery, or line work.

4. The improved polymeric sheet material of claim 1, wherein the improved polymeric sheet material is a fold-over polymeric sheet material in the form of a polymer or polymeric substrate with one or more integrated optical security devices, wherein the one or more integrated optical security devices is made up of an embedded arrangement of focusing elements having at least two different sized focusing elements and a first arrangement of image icons, which are formed directly or applied onto remote portions of one surface of the polymer or polymeric substrate, and a second arrangement of different image icons, which are formed directly or applied on an opposing surface of the polymer or polymeric substrate directly opposite the first arrangement of image icons, wherein when a portion of the polymer or polymeric substrate containing the embedded arrangement of focusing elements is positioned directly over the portion of the polymer or polymeric substrate containing the first and second arrangements of image icons, at least two synthetic images are projected.

5. The improved polymeric sheet material of claim 1, wherein the improved polymeric sheet material is a fold-over polymeric sheet material in the form of a polymer or polymeric substrate with one or more integrated optical security devices, wherein the one or more integrated optical security devices is made up of an arrangement of focusing elements having embedded focusing elements and non-embedded focusing elements, which are all similarly-sized focusing elements, and a first arrangement of image icons, which are formed directly or applied onto remote portions of one surface of the substrate, and a second arrangement of different image icons, which is formed directly or applied onto an opposing surface of the polymer or polymeric substrate directly opposite the first arrangement of image icons, wherein when a portion of the polymer or polymeric substrate containing the arrangement of focusing elements is positioned directly over a portion of the polymer or polymeric substrate containing the first and second arrangements of image icons, at least two synthetic images are projected.

6. The improved polymeric sheet material of claim 1, wherein the improved polymeric sheet material is a fold-over polymeric sheet material in the form of a polymer or polymeric substrate with one or more integrated optical security devices, wherein the one or more integrated optical security devices is made up of an embedded arrangement of similarly sized focusing elements and a first arrangement of image icons, which are formed directly or applied onto remote portions of one surface of the polymer or polymeric substrate, and a second arrangement of different image icons, which is formed directly or applied onto an opposing surface of the polymer or polymeric substrate directly opposite the first arrangement of image icons, wherein when the portion of the polymer or polymeric substrate containing the embedded arrangement of similarly sized focusing elements is positioned directly over the portion of the polymer or polymeric substrate containing the first and second arrangements of image icons at a first distance, at least one image is projected, and when the portion of the polymer or polymeric substrate containing the embedded arrangement of similarly sized focusing elements is positioned directly over the portion of the substrate containing the first and second arrangements of image icons at a second distance, at least one different image is projected.

7. The improved polymeric sheet material of claim 1, wherein an opacifying coating is used to cover remaining portions of the polymer or polymeric substrate.

8. The improved polymeric sheet material of claim 1, wherein the image icons are formed from coated or filled voids or recesses on or within the polymer or polymeric substrate.

9. An improved polymeric sheet material for use in making polymeric security documents, which is made up of a polymer or polymeric substrate having a thickness greater than or equal to 60 microns and one or more integrated or applied optical security devices which project one or more synthetic images, the one or more optical security devices being integrated or applied to all or part of the polymer or polymeric substrate, wherein when the one or more optical security devices is positioned on or within only a portion of the polymer or polymeric substrate,
wherein the improved polymeric sheet material is a fold-over polymeric sheet material having one or more integrated optical security devices, wherein the one or more integrated optical security devices is made up of an arrangement of metalized hybrid refractive/reflective focusing elements that are partially reflective and partially transparent positioned below a first arrangement of image icons on an upper surface of the polymer or polymeric substrate, a second arrangement of different image icons positioned directly below the first arrangement of image icons and the arrangement of metalized hybrid refractive/reflective focusing elements on a lower surface of the polymer or polymeric substrate, and a third arrangement of image icons positioned remotely from the second arrangement of different image icons on the lower surface of the polymer or polymeric substrate,
wherein when the improved polymeric sheet material is folded such that the third arrangement of image icons is positioned over the arrangement of metallized hybrid refractive/reflective focusing elements and the first and second arrangements of image icons, the improved polymeric sheet material projects one or more synthetic images in transmitted light, which is viewable from the lower surface of the polymer or polymeric substrate.

10. The improved polymeric sheet material of claim 9, wherein an opacifying coating is used to cover remaining portions of the polymer or polymeric substrate.

11. An improved polymeric sheet material for use in making polymeric security documents, which is made up of a polymer or polymeric substrate having a thickness greater than or equal to 60 microns and one or more integrated or applied optical security devices which project one or more synthetic images, the one or more optical security devices being integrated or applied to all or part of the polymer or polymeric substrate, the one or more optical security devices is positioned on or within only a portion of the polymer or polymeric substrate, wherein the improved polymeric sheet material has one or more integrated optical security devices, wherein the one or more integrated optical security devices is made up of a first arrangement of focusing elements and a first arrangement of image icons, which are formed directly or applied onto all or part of one surface of the polymer or polymeric substrate, and a second arrangement of focusing elements and a second arrangement of image icons, which are formed directly or applied onto all or part of an opposing surface of the polymer or polymeric substrate, wherein the focusing elements on one surface of the substrate focus on image icons on an opposing surface of the polymer or polymeric substrate, the improved polymeric sheet material displaying one or more images on opposing surfaces, wherein the improved polymeric sheet material has:
  (a) an arrangement of non-embedded or open focusing elements on each side of the polymer or polymeric substrate, each arrangement of focusing elements having one or more of the following:
    i. a rotation angle that is different from the rotation angle of the other arrangement;
    ii. a lattice structure that is different from the lattice structure of the other arrangement; or
    iii. a pitch that is different from the pitch of the other arrangement;
    or
  (b) an arrangement of embedded or sealed focusing elements on each side of the polymer or polymeric substrate, each arrangement of focusing elements having one or more of the following:
    i. a rotation angle that is different from the rotation angle of the other arrangement;
    ii. a lattice structure that is different from the lattice structure of the other arrangement; or
    iii. a pitch that is different from the pitch of the other arrangement;
    or
  (c) an arrangement of non-embedded or open focusing elements on one side of the polymer or polymeric substrate and an arrangement of embedded focusing elements on an opposing side.

12. The improved polymeric sheet material of claim 11, wherein the improved polymeric sheet material has non-embedded or open focusing elements on one side of the polymer or polymeric substrate and embedded focusing elements on an opposing side of the polymer or polymeric substrate.

13. The improved polymeric sheet material of claim 11, wherein an opacifying coating is used to cover remaining portions of the polymer or polymeric substrate.

14. An improved polymeric sheet material for use in making polymeric security documents, which is made up of a polymer or polymeric substrate having a thickness greater than or equal to 60 microns and one or more integrated or applied optical security devices which project one or more synthetic images, the one or more optical security devices being integrated or applied to all or part of the polymer or polymeric substrate, wherein when the one or more optical security devices is positioned on or within only a portion of the polymer or polymeric substrate, wherein the improved polymeric sheet material has one or more integrated optical security devices made up of an arrangement of focusing elements and an arrangement of image icons, the arrangement of image icons comprising image icons formed from voids or recesses on or within the polymer or polymeric substrate which are filled or coated with a material having a different index of refraction than surrounding or underlying material, a dyed material, a metal, or a pigmented material, the voids or recesses each measuring from 0.5 to 8 microns in total depth and greater than or equal to 0.5 microns in total width, wherein the polymer or polymeric substrate serves as an optical spacer.

15. The improved polymeric sheet material of claim 14, wherein an opacifying coating is used to cover remaining portions of the polymer or polymeric substrate.

16. A method of forming an improved polymeric sheet material, the method comprising:
    forming a microstructure-bearing release liner comprising a lens mold layer adhered to a carrier film, wherein the lens mold layer is formed from a curable resin having a plurality of voids with negative lens geometries, the negative lens geometries made by ultraviolet curing the curable resin against a rigid surface having positive lens geometries;
    filling the plurality of voids with an optically functional ultraviolet curable liquid polymer, applying pressure with a nip roller to exclude excess liquid polymer, and simultaneously exposing the ultraviolet curable liquid polymer to ultraviolet radiation such that the optically functional ultraviolet curable polymer cures or hardens and can be lifted from the lens mold layer;
    applying a curable resin material to a surface of a second release liner and curing the curable resin material against a rigid icon mold to form one or more arrangements of image icons in a form of voids within a surface of the curable resin material;
    filling the voids with a material providing a contrast with the curable resin material to form a filled image icon layer;
    applying one or more adhesive layers to transferable layers;
    placing an adhesive side of each transferable layer in contact with opposing sides of the polymer or polymeric substrate;
    applying heat or pressure to each transferable layer causing an adhesive in the adhesive layer to bond securely to the polymer or polymeric substrate; and
    peeling away the release liner with lens mold layer and the second release liner, leaving behind focusing element and image icon layers.

* * * * *